United States Patent
Briffod et al.

(10) Patent No.: US 10,067,013 B2
(45) Date of Patent: Sep. 4, 2018

(54) METHOD OF DETERMINING DEFORMATION IN A STRUCTURE

(71) Applicant: OMNISENS SA, Morges (CH)

(72) Inventors: Fabien Briffod, Morges (CH); Etienne Rochat, Valeyres sous Ursins (CH)

(73) Assignee: OMNISENS SA, Morges (CH)

( * ) Notice: Subject to any disclaimer, the term of this patent is extended or adjusted under 35 U.S.C. 154(b) by 121 days.

(21) Appl. No.: 15/311,942

(22) PCT Filed: Jun. 26, 2014

(86) PCT No.: PCT/EP2014/063613
§ 371 (c)(1),
(2) Date: Nov. 17, 2016

(87) PCT Pub. No.: WO2015/197127
PCT Pub. Date: Dec. 30, 2015

(65) Prior Publication Data
US 2017/0102278 A1    Apr. 13, 2017

(51) Int. Cl.
| | | |
|---|---|---|
| *F16L 11/18* | (2006.01) | |
| *G01L 1/24* | (2006.01) | |
| *G01B 11/16* | (2006.01) | |
| *G01M 11/08* | (2006.01) | |
| *F16L 11/08* | (2006.01) | |

(52) U.S. Cl.
CPC ............ *G01L 1/242* (2013.01); *F16L 11/081* (2013.01); *G01B 11/18* (2013.01); *G01M 11/085* (2013.01)

(58) Field of Classification Search
CPC ........ G01L 1/242; F16L 11/081; G01B 11/18; G01M 11/085
See application file for complete search history.

(56) References Cited

FOREIGN PATENT DOCUMENTS

| | | | | |
|---|---|---|---|---|
| EP | 2063068 A1 | 5/2009 | | |
| JP | WO 2014083989 A1 | * 6/2014 | ......... | G01D 5/35358 |
| WO | 2012059736 A2 | 5/2012 | | |
| WO | 2014064460 A2 | 5/2014 | | |

OTHER PUBLICATIONS

International Search Report and Written Opinion dated Apr. 8, 2015 for PCT/EP2014/063613.

* cited by examiner

*Primary Examiner* — Matthew G Marini
(74) *Attorney, Agent, or Firm* — Pearne & Gordon LLP

(57) ABSTRACT

A method of determining deformation in a structure around which a sensing optical fiber is helically wound, includes performing a distributed measurement at a point along the fiber, to obtain a frequency gain spectrum at that point. Performing a distributed measurement includes, adjusting a pulse width of a pulse pump signal to achieve a predefined spatial resolution and providing the pulse pump signal with adjusted pulse width in the fiber to generate scattering, which is used to obtain the frequency gain spectrum. Identifying at least two curves which, when added together, best fit the frequency gain spectrum. Identifying the frequency at which peaks of the curves occur. Determining deformation in the structure by determining deformation in the fiber at the point using a frequency at which a peak of an identified curve occurs. The amount of deformation in the fiber corresponds to the amount of deformation in the structure.

15 Claims, 11 Drawing Sheets

METHOD OF DETERMINING DEFORMATION IN A STRUCTURE

FIELD OF THE INVENTION

The present invention concerns a method of determining deformation in a structure, around which at least one sensing optical fiber is helically wound, with a spatial resolution within the range '(pitch of the helical wound sensing optical fiber)−(50% of the pitch of the helical wound sensing optical fiber)'-'(pitch of the helical wound sensing optical fiber)+(50% of the pitch of the helical wound sensing optical fiber)'. The method involves performing distributed measurement using the sensing optical fiber to obtain a frequency gain spectrum and performing curve fitting to find curves of best fit for the frequency gain spectrum; and using the frequency at which the peaks of the curves of best-fit occur in order to determine deformation. The deformation in a structure which is determined may include strain within the structure and/or bending radius of the structure.

DESCRIPTION OF RELATED ART

Many flexible subsea structures, such as umbilicals and risers which are used to link vessels/platforms to the sea bed, and other structures such pipe in pipe (PiP), flow lines, power cables and have a layer which is made formed of helically wound members such as helically wound wires. These layers in particular are sensitive to fatigue when the structure is bent or stressed regularly over time. As an example, a riser is a large hose pipe which usually serves as a conduit to lift oil from the seabed to the platform for processing. FIG. 1 shows a perspective view of a riser 80; the riser 80 comprises a central pipe 81, which is usually composed of polymer; the central pipe 81 is surrounded by multiple layers of metal armoured wires 82. These armoured wires 82 serve to prevent the riser 80 from collapsing inwards due to subsea water pressure or from exploding due to fluid pressure within the riser 80. The riser 80 further comprises an additional polymer layers 83 of which provides protection and water tightness. FIG. 2 illustrates an umbilical which comprises various layers which are formed of helically wound wire.

Deformation monitoring in structures, and in particular deformation monitoring in those afore-mentioned structures is important for the monitoring of fatigue accumulation within the structure. Typically the monitoring of deformation in a structure is achieved using an optical sensing cable which is helically wound around the structure and secured to the structure. Typically distributed measurement techniques are performed on the optical sensing cable to detect deformation in the structure.

However existing methods of measuring deformation have poor spatial resolution; existing methods are unable to measure deformation with a spatial resolution which is in the order of the helical pitch of the helically wound optical sensing cable.

It is an aim of the present invention to obviate or mitigate at least some of the above-mentioned disadvantages.

BRIEF SUMMARY OF THE INVENTION

According to the invention there is provided a method of determining deformation in a structure around which at least one sensing optical fiber is helically wound, the method comprising the steps of:

(a) performing a distributed measurement at a point along the at least one sensing optical fiber, to obtain a frequency gain spectrum at that point, wherein the step of performing a distributed measurement comprises, adjusting a pulse width of a pulse pump signal so as to achieve a predefined spatial resolution for the detection of deformation, and providing the pulse pump signal with adjusted pulse width in the sensing optical fiber to generate scattering which is used to obtain said frequency gain spectrum, wherein said predefined spatial resolution for the detection of deformation is a value which is within the range 'pitch of the helical wound sensing optical fiber −50% of the pitch of the helical wound sensing optical fiber'-'pitch of the helical wound sensing optical fiber +50% of the pitch of the helical wound sensing optical fiber';

(b) identifying at least two curves which, when added together, best fit the frequency gain spectrum;

(c) identifying the frequency at which peaks of the at least two curves occur;

(d) determining deformation in the structure by determining deformation in the at least one sensing optical fiber, at said point at which the distributed measurement was performed, using a frequency at which a peak of an identified curve occurs, wherein the amount of deformation in the sensing optical fiber corresponds to the amount of deformation in the structure.

In the present application deformation in the structure includes strain within the structure and/or bending of the structure. Strain includes elongation and compression of the structure. When the structure is locally elongated this is indicated by a positive strain value. When the structure is locally compressed this is indicated by a negative strain value.

The sensing optical fiber is arranged to cooperate with the structure so that the sensing optical fiber bends, elongates and/or compresses when the structure bends, elongates and/or compresses. Thus any amount of elongation, compression or bending in the sensing optical fiber will correspond to the same amount of elongation, compression or bending in the structure. Note that twisting of the structure is a combination of elongation/compression and is therefore a strain of the structure with the corresponding elongation/compression of the fibre.

The step of determining deformation in the structure may comprises, determining the amount of strain in the structure by determining the amount of strain in the sensing optical fiber at said point at which the distributed measurement was performed, using a frequency at which a peak of an identified curve occurs, and a calibration constant ($C_{strain}$) which is representative of the relationship between frequency gain spectrum of the sensing optical fiber and strain in the sensing optical fiber, wherein the amount of strain in the sensing optical fiber corresponds to the amount of strain in the structure. It will be understood that strain can be elongation or compression of the sensing optical fiber.

The method preferably comprises repeating steps (a)-(d) a plurality of times. Preferably the steps are repeated at each of a plurality of points distributed along the whole length of the structure.

The method may comprise the steps of:

performing a distributed measurement at a point along a sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is within the range 'pitch of the helical wound sensing optical fiber −50%'-'pitch of the helical wound sensing optical fiber +50%';

identifying at least two curves which, when added together, best fit the frequency gain spectrum;

identifying the frequency gain at which peaks of the at least two curves occur;

determining the amount of strain in the sensing optical fiber, at said point at which the distributed measurement was performed, using a frequency at which a peak of an identified curve occurs, and a calibration constant ($C_{strain}$) which is representative of the relationship between a frequency gain spectrum of the sensing optical fiber and strain in the sensing optical fiber, wherein the amount of strain in the sensing optical fiber corresponds to the amount of strain in the structure.

The method may comprise the steps of, calculating a central frequency $v_0$ of the frequency gain spectrum using the equation: $v_0=0.5*(v_e-v_c)$, wherein $v_c$ is the lowest frequency gain at which the peak of one of the at least two curves occurs and $v_e$ is the highest frequency gain at which the peak of one of the at least two curves occurs;

determining a first frequency shift value using the equation: $v_0-v_c$ and/or determining a second frequency shift value using the equation: $v_e-v_0$;

determining the amount of strain in the sensing optical fiber, at said point at which the distributed measurement was performed, using the first frequency shift value and said calibration constant ($C_{strain}$), wherein the amount of strain in the sensing optical fiber corresponds to the amount of strain in the structure, and/or determining the amount of strain in the structure, at said point at which the distributed measurement was performed, using the second frequency shift value and said calibration constant, wherein the amount of strain in the sensing optical fiber corresponds to the amount of strain in the structure.

The method may comprise the steps of, identifying the lowest frequency gain ($v_c$) at which a peak of one of the at least two curves occurs and identifying the highest frequency gain ($v_e$) at which the peak of one of the at least two curves occurs;

determining the amount of strain in the sensing optical fiber, at said point at which the distributed measurement was performed, using the identified lowest ($v_c$) and highest ($v_e$) frequency gains and said calibration constant ($C_{strain}$), wherein the amount of strain in the sensing optical fiber corresponds to the amount of strain in the structure.

The step of determining the amount of strain in the sensing optical fiber, at said point at which the distributed measurement was performed, using the identified lowest ($v_c$) and highest ($v_e$) frequency gains and said calibration constant ($C_{strain}$), comprises determining the amount of strain in the sensing optical fiber using the equation: $\varepsilon=(v_e-v_c)/(2 \cdot C_{strain})$ The method may comprise the steps of, calculating a central frequency $v_0$ of the frequency gain spectrum using the equation: $v_0=0.5*(v_e-v_c)$, wherein $v_c$ is the lowest frequency gain at which the peak of one of the at least two curves occurs and $v_e$ is the highest frequency gain at which the peak of one of the at least two curves occurs;

determining the amount of strain ($\varepsilon$) in sensing optical fiber using the equation $$\varepsilon=(v_0-v_{ref})/C_{strain}$$

wherein $C_{strain}$ is a calibration constant which is representative of the relationship between a frequency gain spectrum of the sensing optical fiber and strain in the sensing optical fiber, and wherein $v_{ref}$ is the frequency gain at which the peak of a frequency gain spectrum of the sensing optical fiber, obtained when the sensing optical fiber is unstrained, occurs.

The method may comprise the step of calculating a bending radius of the structure using the determined amount of strain in the sensing optical fiber.

The step of calculating a bending radius of the structure using the amount of strain in the sensing optical fiber may comprise, calculating the bending radius of the structure using at least one of the equations:

$$(a \cdot C_{strain}/v_0-v_c) \text{ or,}$$

$$(a \cdot C_{strain}/v_e-v_0) \text{ or,}$$

$$(2a \cdot C_{strain}/v_e-v_c)$$

wherein a is the distance between the sensing fibre and the structure neutral axis wherein the structure neutral axis is an axis in the cross section of a structure along which there are no longitudinal stresses or strains, $v_c$ is the lowest frequency at which the peak of one of the at least two curves occurs and $v_e$ is the highest frequency gain at which the peak of one of the at least two curves occurs, and $C_{strain}$ is a calibration constant which is representative of the relationship between a frequency gain spectrum of the sensing optical fiber and strain in the sensing optical fiber.

The method may comprise the steps of determining the calibration constant by, elongating the sensing optical fiber to a plurality of lengths;

obtaining the frequency gain spectrum at each of the plurality of lengths;

obtaining the frequencies at which the peaks of each of the plurality of frequency gain spectrum occurs;

plotting a graph of the obtained frequencies verses length of the sensing optical fiber;

obtaining the slope of the graph, wherein the slope of the graph defines the calibration constant.

Typically there will be a linear relationship between the frequencies at which the peaks of each of the plurality of frequency gain spectrum occurs the sensing optical fiber and the corresponding plurality of lengths of the sensing optical fiber. The amount of compression or elongation in the structure can be determined from the change in length of the structure. A change in the length of the structure will also correspond to a change in the frequency at which the peak(s) of the frequency gain spectrum occur, and this change is referred to as a frequency shift.

The predefined spatial resolution for the detection of deformation may be a value which is within the range 'pitch of the helical wound sensing optical fiber'-'pitch of the helical wound sensing optical fiber +50%'.

The method may comprise the step of, determining the amount ($\Delta L$) of elongation or compression in the sensing optical fiber using the equation:

$$\varepsilon=\Delta L/L_{ref}$$

wherein $\varepsilon$ is said determined amount of strain in the sensing optical fiber, and $L_{ref}$ is the length of the sensing optical fiber when the sensing optical fiber is unstrained, wherein the amount ($\Delta L$) of elongation or compression in the sensing optical fiber corresponds to the amount of elongation or compression in the structure.

At least two sensing optical fibers may be helically wound around the structure, each of the at least two sensing optical fibers occupying a different position on the structure, and wherein said predefined spatial resolution for the detection of deformation may be a value which is within the range 'pitch of the helical wound sensing optical fiber'-'(pitch of the helical wound sensing optical fiber)-(50% of the pitch of the helical wound sensing optical fiber)', and the method may comprise the steps of:

performing steps (a)-(b) with each of the at least two sensing optical fibers;

wherein the step of identifying the frequency at which peaks of the at least two curves occur comprises, from all of the best fit curves obtained identifying the lowest frequency ($v_c$) at which the peak of a curve occurs and identifying the highest frequency ($v_e$) at which the peak of a curve occurs;

wherein the step of determining deformation in the structure comprises determining strain in the structure by determining the amount of strain in the sensing optical fiber at said point at which the distributed measurement was performed, using said lowest frequency ($v_c$) and/or said highest frequency ($v_e$), and a calibration constant ($C_{strain}$) which is representative of the relationship between a frequency gain spectrum of the sensing optical fiber and strain in the sensing optical fiber, wherein the amount of strain in the sensing optical fiber corresponds to the amount of strain in the structure.

The structure may be provided with more than two sensing optical fibers helically wound around the structure, wherein said more than two sensing optical fibers which are arranged to cooperate with the structure. Preferably the said more than two sensing optical fibers are arranged to be secured to a surface of the structure. Preferably said more than two sensing optical fibers which are arranged so that they are positioned symmetrically around the structure. For example the structure may be a pipe. The pipe may have three sensing optical fibers helically wound around the outer surface of the pipe; the three sensing optical fiber may be arranged so that they are symmetrically positioned around the circumference of the pipe; for example the three sensing optical fibers may be positioned on the surface of the pipe such that there is 120° angle between each successive sensing optical fiber. Likewise, if the pipe is provided with four sensing optical fibers, the four optical fibers may be positioned on the outer surface of the pipe so there is an angle of 90° between each successive sensing optical fiber. It will be understood that the said more than two sensing optical fibers may be are arranged so that they are positioned asymmetrically around the structure. For example, there may be 3 optical fibers provided which cooperate with the structure, and may be arranged such that there is 120° between two of the optical fibers and 20° between one of said two optical fibers and the third optical fiber.

Two or more sensing optical fibers may be helically wound around the structure, and arranged such that there is a predefined angle between each of the two or more sensing optical fibers and a reference axis on the structure, and the method may further comprise the steps of performing steps (a)-(d) with each of the two or more sensing optical fibers.

Performing steps (a)-(d) with each of the two or more sensing optical fibers, will provide two or more frequency gain spectrums, and will provide, for each of the two or more frequency gain spectrums, at least two curves which best fit that frequency gain spectrum.

The method may comprise the step of computing the bending direction of the structure by carrying out the steps of:

for each of the two or more frequency gain spectrums, compute the ratio of the amplitude of the peak of a best fit curve occurring at the lowest frequency to the amplitude of the peak of a best fit curve occurring at the highest frequency so as to obtain a ratio value for each of the two or more frequency gain spectrums;

plot the two or more ratio values against the angle between the reference axis and corresponding sensing optical fiber;

identify a sine graph which can best fit to the plotted ratio values;

determine the phase of the identified sine graph;

determine the angular position, with respect to the reference axis, of a measurement point, wherein the measurement point is a point on the sensing optical fiber which is a distance equal to half the spatial resolution from the point where said distributed measurement was carried out determine the bending direction of the structure from the determined sine phase wherein the bending direction is given by a counter clockwise bending around an axis which is orientated at a position which is (phase of the sine) from the reference axis.

The predefined angle between each of the two or more sensing optical fibers and a reference axis on the structure may be an angle from the reference axis to the sensing optical fiber, in a clockwise direction around the structure. The predefined angle between each of the two or more sensing optical fibers and a reference axis on the structure may be an angle from the reference axis to the sensing optical fiber, in an anti-clockwise direction around the structure.

The method may comprise measuring the position of the two or more sensing optical fibers relative to a reference axis on the structure. The method may comprise measuring the position of the two or more sensing optical fibers relative to each other. The method may comprise measuring the angle between each of the two or more sensing optical fibers and a reference axis on the structure. The method may comprise measuring the angle between each of the two or more sensing optical fibers.

The step of identifying at least two curves which, when added together, best fit the frequency gain spectrum may comprise the step of identifying the max amplitude of the frequency spectrum and identifying at least two frequencies at which the frequency gain spectrum has an amplitude equal to half the maximum amplitude of the frequency gain spectrum. The step of determining the deformation of the structure may comprise the step of determining the deformation of the sensing optical fiber using said identified at least two frequencies at which the frequency gain spectrum has an amplitude equal to half the maximum amplitude of the frequency gain spectrum, wherein the deformation of the sensing optical fiber corresponds to the deformation of the structure. For example the deformation in the form of the bending radius of the structure may be determined in this way.

The method may further comprise the step of computing the difference between the highest frequency ($v_e$) at which the frequency gain spectrum has an amplitude which is equal to half the maximum amplitude of the frequency gain spectrum, and the lowest frequency ($v_c$) at which the frequency gain spectrum has an amplitude which is equal to half the maximum amplitude of the frequency gain spectrum, and estimating the bending radius of the sensing optical fiber using said computed difference between the highest frequency ($v_e$) and the lowest frequency ($v_c$), wherein the bending radius of the sensing optical fiber corresponds to the bending radius of the structure around which a sensing optical fiber is helically wound.

The step of estimating the bending radius of the sensing optical fiber may comprise using said computed difference between the highest frequency ($v_e$) and the lowest frequency ($v_c$), and the calibration constant ($C_{strain}$), to estimate the bending radius of the sensing optical fiber using the equation ($2a \cdot C_{strain}/v_e - v_c$) wherein a is the distance between the sensing fibre and the structure neutral axis wherein the structure neutral axis is an axis in the cross section of a structure along which there are no longitudinal stresses or strains.

The method may comprise the steps of estimating the bending radius of a structure around which a sensing optical fiber is helically wound by, determining the width of the frequency gain spectrum at half the maximum amplitude of the frequency gain spectrum;

estimating the amount of bending in the sensing optical fiber using said determined width, wherein the amount of bending in the sensing optical fiber corresponds to the amount of bending in the structure.

According to a further aspect of the present invention there may be provided a method of determining strain in a structure around which at least two sensing optical fibers are helically wound, the at least two sensing optical fibers each occupying a different position on the structure, the method comprising the steps of:

for each of the at least two sensing optical fibers, performing a distributed measurement at a point along the sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is less than the pitch of the helical wound sensing optical fiber;

for each of the at least two frequency gain spectrums obtained, identifying at least two curves which, when added together, best fit the frequency gain spectrum;

from all of the best fit curves obtained, identifying the lowest frequency ($v_c$) at which the peak of a curve occurs and identifying the highest frequency ($v_e$) at which the peak of a curve occurs;

determining the amount of strain in the sensing optical fiber, at said point at which the distributed measurement was performed, using said lowest frequency ($v_c$) and/or said highest frequency ($v_e$), and a calibration constant ($C_{strain}$) which is representative of the relationship between a frequency gain spectrum of the sensing optical fiber and strain in the sensing optical fiber, wherein the amount of strain in the sensing optical fiber corresponds to the amount of strain in the structure.

The structure may be provided with more than two sensing optical fibers helically wound around the structure, wherein said more than two sensing optical fibers which are arranged to cooperate with the structure. Preferably the said more than two sensing optical fibers are arranged to be secured to a surface of the structure. Preferably said more than two sensing optical fibers which are arranged so that they are positioned symmetrically around the structure. For example the structure may be a pipe. The pipe may have three sensing optical fibers helically wound around the outer surface of the pipe; the three sensing optical fiber may be arranged so that they are symmetrically positioned around the circumference of the pipe; for example the three sensing optical fibers may be positioned on the surface of the pipe such that there is 120° angle between each successive sensing optical fiber. Likewise, if the pipe is provided with four sensing optical fibers, the four optical fibers may be positioned on the outer surface of the pipe so there is an angle of 90° between each successive sensing optical fiber. It will be understood that the said more than two sensing optical fibers may be are arranged so that they are positioned asymmetrically around the structure. For example, there may be 3 optical fibers provided which cooperate with the structure, and may be arranged such that there is 120° between two of the optical fibers and 20° between one of said two optical fibers and the third optical fiber The method of determining strain of determining strain may comprise the steps of, calculating a central frequency $v_0$ of the frequency gain spectrum using the equation: $v_0 = 0.5 * (v_e - v_c)$ determining a first frequency shift value using the equation: $v_0 - v_c$ and/or determining a second frequency shift value using the equation: $v_e - v_0$;

determining the amount of strain in the sensing optical fiber, at said point at which the distributed measurement was performed, using the first frequency shift value and said calibration constant ($C_{strain}$), wherein the amount of strain in the sensing optical fiber corresponds to the amount of strain in the structure, and/or determining the amount of strain in the structure, at said point at which the distributed measurement was performed, using the second frequency shift value and said calibration constant, wherein the amount of strain in the sensing optical fiber corresponds to the amount of strain in the structure.

The method of determining strain may comprise the step of, determining the amount of strain in the sensing optical fiber, at said point at which the distributed measurement was performed, using the identified lowest ($v_c$) and highest ($v_e$) frequency and said calibration constant ($C_{strain}$), wherein the amount of strain in the sensing optical fiber corresponds to the amount of strain in the structure.

The method of determining strain may comprise the steps of, calculating a central frequency $v_0$ of the frequency gain spectrum using the equation:

$$v_0 = 0.5 * (v_e - v_c);$$

determining the amount of strain ($\varepsilon$) in sensing optical fiber using the equation:

$$\varepsilon = (v_0 - v_{ref})/C_{strain}$$

wherein $C_{strain}$ is a calibration constant which is representative of the relationship between a frequency gain spectrum of the sensing optical fiber and strain in the sensing optical fiber, and wherein $v_{ref}$ is the frequency at which the peak of a frequency gain spectrum of the sensing optical fiber, obtained when the sensing optical fiber is unstrained, occurs.

The method of determining strain may comprise the steps of calculating a bending radius of the structure using the determined amount of strain in the sensing optical fiber.

The method of determining strain may comprise the steps of calculating a bending radius of the structure using at least one of the equations:

$$(a \cdot C_{strain}/v_0 - v_c) \text{ or,}$$

$$(a \cdot C_{strain}/v_e - v_0) \text{ or,}$$

$$(2a \cdot C_{strain}/v_e - v_c)$$

wherein 'a' is the distance between the sensing fibre and the structure neutral axis wherein the structure neutral axis is an axis in the cross section of a structure along which there are no longitudinal stresses or strains.

The method of determining strain may comprise the steps of determining the calibration constant by elongating the sensing optical fiber to a plurality of lengths;

obtaining the frequency gain spectrum at each of the plurality of lengths;

obtaining the frequencies at which the peaks of each of the plurality of frequency gain spectrum occurs;

plotting a graph of the obtained frequencies verses length of the sensing optical fiber;

obtaining the slope of the graph, wherein the slope of the graph defines the calibration constant.

The method of determining strain may comprise the step of, determining the amount ($\Delta L$) of elongation or compression in the sensing optical fiber using the equation:

$$\varepsilon = \Delta L / L_{ref}$$

wherein $\varepsilon$ is said determined amount of strain in the sensing optical fiber, and $L_{ref}$ is the length of the sensing optical fiber when the sensing optical fiber is unstrained, wherein the amount ($\Delta L$) of elongation or compression in the sensing optical fiber corresponds to the amount of elongation or compression in the structure.

According to a further aspect of the present invention there may be provided a method of determining the bending direction of a structure around which two or more sensing optical fibers are helically wound, the angle between each of the two or more sensing optical fibers and a reference axis on the structure being known, the method comprising the steps of the method comprising the steps of:

for each of the two or more sensing optical fibers, performing a distributed measurement at a point along a sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is less than 'pitch of the helical wound sensing optical fiber +50%';

for each of the at least two frequency gain spectrums obtained, identifying at least two curves which, when added together, best fit the frequency gain spectrum;

for each of the two or more frequency gain spectrums, compute the ratio of the amplitude of the peak of a best fit curve occurring at the lowest frequency to the amplitude of the peak of a best fit curve occurring at the highest frequency so as to obtain a ratio value for each of the two or more frequency gain spectrum plotting the at least two ratio values against the angle between the reference axis and corresponding sensing optical fiber;

identifying a sine graph which can best fit to the plotted ratio values;

determining the phase of the identified sine graph;

determining the angular position, with respect to the reference axis, of a measurement point, wherein the measurement point is a point on the sensing optical fiber which is a distance equal to half the spatial resolution from the point where said distributed measurement was carried out determining the bending direction of the structure from the determined sine phase wherein the bending direction is given by a counter clockwise bending around an axis which is orientated at a position which is (phase of the sine) from the reference axis.

The method may comprise measuring the position of the two or more sensing optical fibers relative to a reference axis on the structure. The method may comprise measuring the position of the two or more sensing optical fibers relative to each other. The method may comprise measuring the angle between each of the two or more sensing optical fibers and a reference axis on the structure. The method may comprise measuring the angle between each of the two or more sensing optical fibers.

According to a further aspect of the present invention there is provided a method for estimating the bending radius of a structure around which a sensing optical fiber is helically wound, the method comprising the steps of, performing a distributed measurement at a point along a sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is within the range 'pitch of the helical wound sensing optical fiber-50%'-'pitch of the helical wound sensing optical fiber +50%';

determining the width of the frequency gain spectrum at half the maximum amplitude of the frequency gain spectrum;

estimating the amount of bending in the sensing optical fiber using said determined width, wherein the amount of bending in the sensing optical fiber corresponds to the amount of bending in the structure.

The step of determining the width of the frequency gain spectrum at half the maximum amplitude of the frequency gain spectrum may comprise determining the highest frequency ($v_e$) at which frequency gain spectrum has and amplitude which is half the maximum amplitude of the frequency gain spectrum; and determining the lowest frequency ($v_c$) at which frequency gain spectrum has and amplitude which is half the maximum amplitude of the frequency gain spectrum, and subtracting the lowest frequency ($v_c$) from the highest frequency ($v_e$) to obtain the width of the frequency gain spectrum at half the maximum amplitude.

The step of estimating the bending radius of the sensing optical fiber may comprise using said computed difference between the highest frequency ($v_e$) and the lowest frequency ($v_c$), and the calibration constant ($C_{strain}$), to estimate the bending radius of the sensing optical using the equation ($2a \cdot C_{strain}/v_e-v_c$) wherein a is the distance between the sensing fibre and the structure neutral axis wherein the structure neutral axis is an axis in the cross section of a structure along which there are no longitudinal stresses or strains.

A method of determining the direction of bending of a structure around which two or more sensing optical fibers are helically wound, and wherein each of the two or more sensing optical fibers have a predefined position relative to one another, the method comprising the steps of:

for each of the two or more sensing optical fibers, performing a distributed measurement at a point along each of the sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is greater than 0.1*(pitch of a helical wound sensing optical fiber);

identifying the frequencies at which peaks of the two or more frequency gain spectrums occur;

determine the difference between the amplitudes of each of the two or more frequency gain spectrums at each of the identified the frequencies;

using the determined difference between the amplitudes and the predefined position of the sensing optical fibers relative to one another to determine the direction of bending of the structure.

Any of the above mentioned embodiments or aspects of the invention may comprise any of the following steps or features:

The step of performing a distributed measurement may comprise performing a Brillouin measurement comprising, providing said pulse pump signal in a first end of an sensing optical fiber, and providing a probe signal in the opposite end of said sensing optical fiber, so that both the pulse pump and probe signals can interact in the optical fibre to generate stimulated Brillouin backscattering, detecting the stimulated Brillouin backscattering and using the detected stimulated Brillouin backscattering to obtain a frequency gain spectrum in the form of a Brillouin frequency gain spectrum.

The step of performing a distributed measurement may comprise providing a sensing optical fiber which comprises one or more fibre brag gratings (FBG), providing the pulse pump signal in the sensing optical fiber, scattering the pulse pump signal using the fibre brag gratings, using the scattering of the pulse pump signal to obtain a frequency gain spectrum in the form of a FBG frequency spectrum.

The step of performing a distributed measurement may comprise providing a sensing optical fiber which comprises a single weak fibre brag gratings (WFBG), providing the pulse pump signal in the sensing optical fiber, scattering the pulse pump signal using the continuous weak fibre brag gratings, using the scattering of the pulse pump signal to obtain a frequency gain spectrum in the form of a WFBG frequency spectrum.

The predefined spatial resolution for the detection of strain may be a value which is within the range: 'pitch of the helical wound sensing optical fiber −10% of the pitch of the helical wound sensing optical fiber'-'pitch of the helical wound sensing optical fiber +10% of the pitch of the helical wound sensing optical fiber'. Preferably the predefined spatial resolution for the detection of strain is a value which is within the range 40 cm-7 m.

The method may comprise the step of identifying more than two curves which, when added together, best fit the frequency gain spectrum.

The method may comprise the steps of, comparing the determined amount of strain in structure with a threshold value and triggering an alarm if the determine amount of strain exceeds the threshold value.

The method may comprise the steps of, comparing the determined bending radius in structure with a threshold bending radius value and triggering an alarm if the determine amount of bending radius exceeds the threshold bending radius value The structure may comprise at least one of a pipe, riser, umbilical, power cable.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
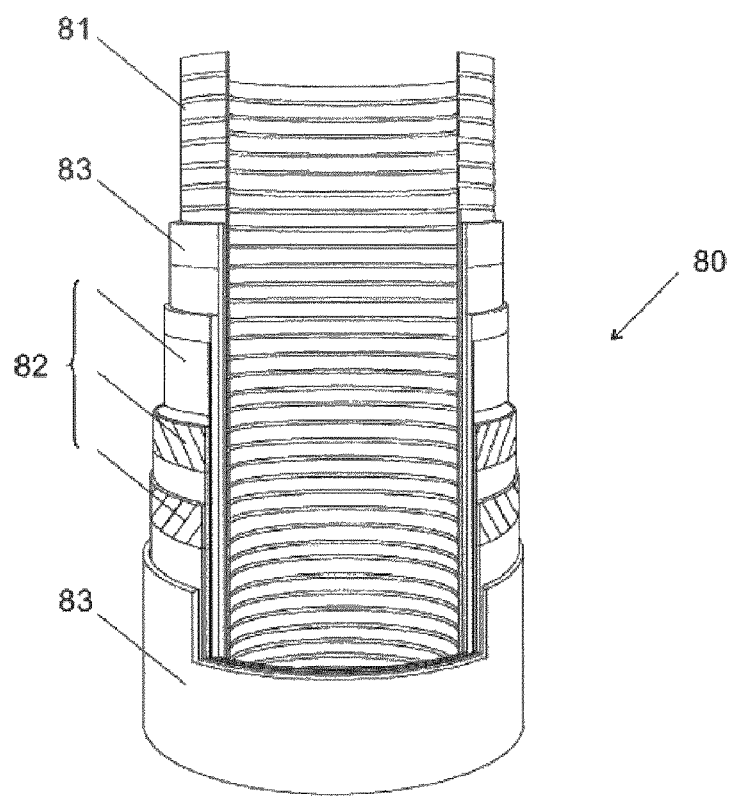
FIG. 1 illustrates an example of a riser which has tensile layers which are formed of helically wound wire.
Figure 2:
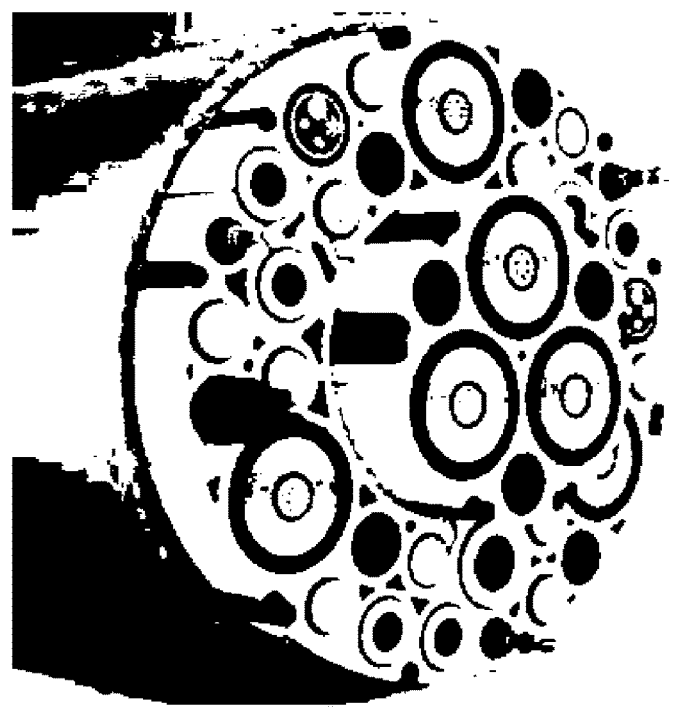
FIG. 2 illustrates an umbilical which comprises various layers which are formed of helically wound wire.
Figure 3:
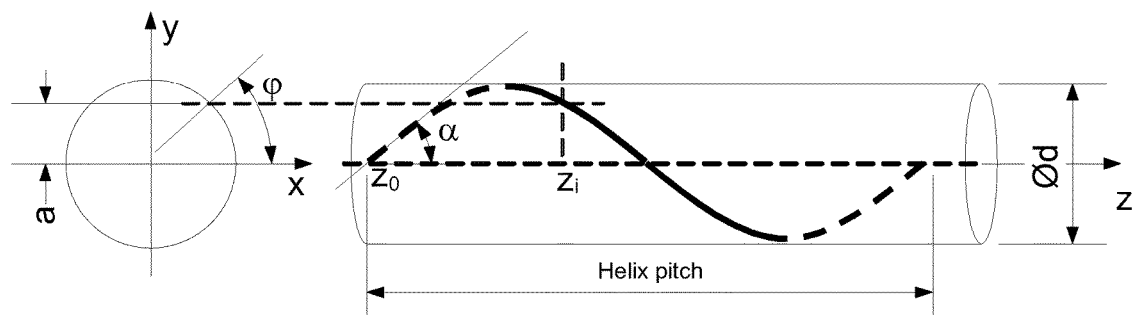
FIG. 3 illustrates a schematic of fibre coiled in helix on a tube or pipe.

When a structure featuring a sensing fibre in helix is bended, the strain level is non-uniform. The measured strain at position z depends on the helix pitch (and therefore the angle $\alpha$) as shown in FIG. 3 which illustrates a schematic of fibre coiled in helix on a tube or pipe. Assuming pure bending around the x-axis, strain at location $z_i$ is given by the sensor distance a to the tube neutral fibre (from a mechanical point of view, the neutral fibre is in the tube centre in this case), which is related to the angle $\varphi$ and ultimately to the helix pitch. Note that φ defines the angular position of the fibre with respect to the direction of the bending.

The strain ε in a fibre, given in [%] or in micro deformation [µε] corresponding to 1exp−6, is defined as the deformation (elongation or compression) divided by the total length submitted to the deformation (Eq. 1). The sign of ε differentiates between compression (−) and elongation (+).

$$\varepsilon = \frac{\Delta L}{L} \qquad \text{Eq. 1}$$

Figure 4:
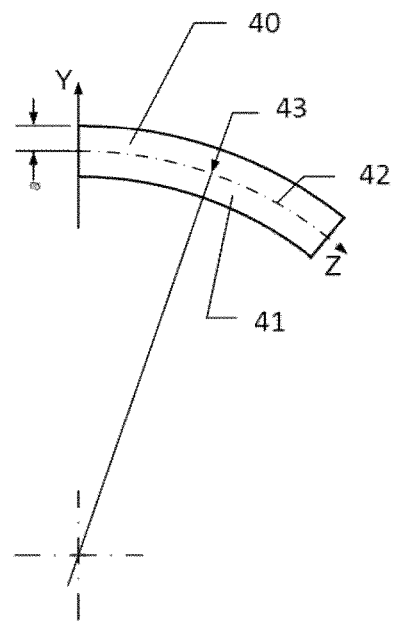
FIG. 4 illustrates pure bending with bending radius $\rho$ for a sensing element at distance 'a' from the neutral fibre.

FIG. 4 illustrates pure bending with bending radius ρ for a sensing element at position a from the neutral fibre. For pure bending, as shown in FIG. 4, strain only depends on the bending radius ρ and the fibre position a with respect to the umbilical neutral axis (in the figure, corresponds to the dotted line):

$$\varepsilon = \frac{a}{\rho} \qquad \text{Eq. 2}$$

Note that the fibre position a is measured in the plane of the bending direction (defined as y-z in both FIG. 3 and FIG. 4).

The neutral axis of the structure is an axis in the cross section of the structure along which there are is longitudinal strain when the structure is under bending condition. If the section is symmetric, isotropic and homogeneous (for instance a cylindrical metal rod), then the neutral axis corresponds to the geometrical center axis of the rod. When the structure is bended, it defines a bending plane. The part of the rod/structure inside the bending curve is under compression whilst the part of the rod/structure outside the bending curve is under elongation.

The distance a to the neutral axis in our case is the distance between the sensing fibre and the neutral axis measured in the bending plane (see FIG. 3). For a given distance a, there are two positions that produces the same strain ε (on the +x and −x side in FIG. 3).

In operation, ε is the measurement data provided by the Brillouin measurement so that the local bending radius is computed simply by Eq. 2 as $$\rho = \frac{a}{\varepsilon} \qquad \text{Eq. 2}$$

It can be shown that $$a = 0.5d \, \sin\left[\frac{z \tan \alpha}{0.5 d}\right] \qquad \text{Eq. 3}$$

where d is the tube external diameter (assuming the fibre is positioned on the tube external diameter, on the Y-axis, then d=2a).

Assuming a constant bending around the axis x (that is in the Y-Z plane), with a bending radius ρ and using Eq. 2 and Eq. 3, measured strain will vary according to a sine function (FIG. 4). FIG. 4 is an exemplary graph illustrating the strain on an umbilical, assuming 2 m pure bending radius and 1 m helix pitch on a 2″ diameter tube.

Figure 5:
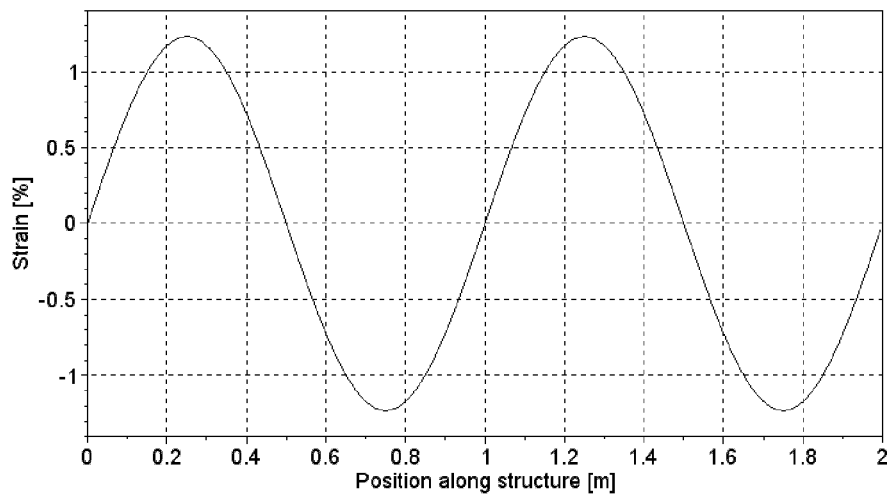
FIG. 5 is an exemplary graph illustrating the strain on an umbilical, assuming 2 m pure bending radius and 1 m helix pitch on a 2" diameter tube.

The sine nature of the strain resulting from the helix combined with the finite instrument spatial resolution has an influence on the measurement accuracy as can be seen in FIG. 5.

FIG. 5 illustrates the error on the measured strain, as a function of bending radius for a helix pitch of 10 m and a spatial resolution of 1 m Strain is defined on a 2″ diameter tube.

To limit the measurement error, a rule of thumb indicates (plain curve FIG. 5) that the spatial resolution must be about ten times shorter than the helix pitch. This ratio is easily obtained when the pith is in the 10 m range but is much more challenging when the pitch is in the 1 m range (note that the pitch depends on the manufacturing process on one side and on the required mechanical resistance on the other hand). In the latter case, a spatial resolution of 10 cm would be ideal and this is not straightforward in distributed Brillouin based sensing.

Figure 6:
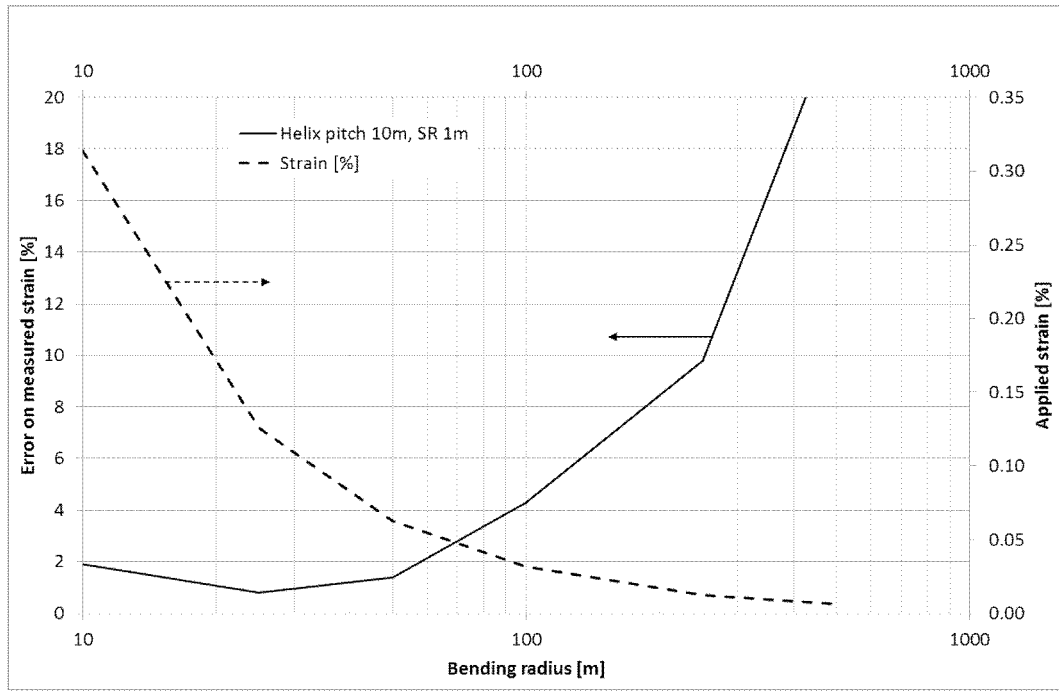
FIG. 6 illustrates the error on the measured strain, as a function of bending radius and helix pitch.
Figure 7:
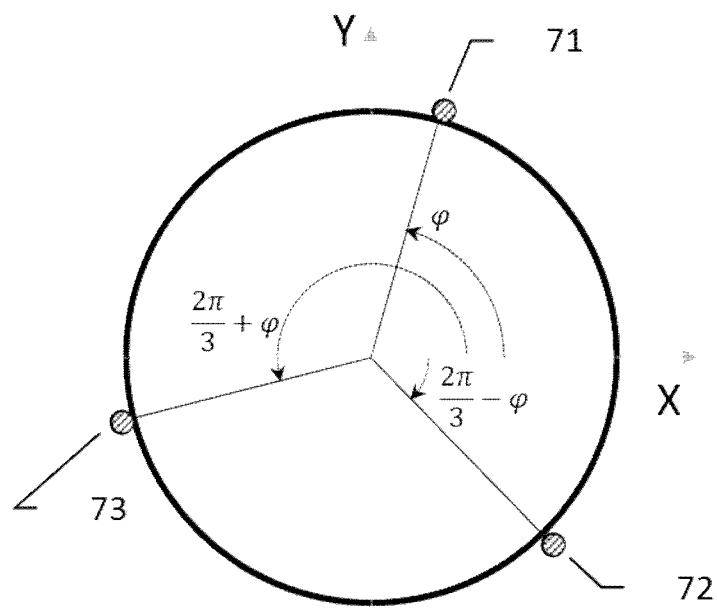
FIG. 7 shows the geometrical position and relationship between three sensing optical fibers provided on a tube or pipe.

In most cases, there will be at least two, and preferably three, strain sensors along the structures. The 3 sensors position with respect to each other is known. FIG. 6 shows the geometrical position and relationship between three strain sensors 71, 72, 73.

For the 3 sensors, the strain is given by the bending radius, the angular position of the sensor and the distance to the neutral axis. Under the same assumption then before, we get $$\varepsilon_1 = \varepsilon_{long} + \frac{d}{2\rho}\sin\varphi \qquad \text{Eq. 4}$$

$$\varepsilon_2 = \varepsilon_{long} + \frac{d}{2\rho}\sin\left(\frac{2\pi}{3} + \varphi\right) \qquad \text{Eq. 5}$$

$$\varepsilon_3 = \varepsilon_{long} + \frac{d}{2\rho}\sin\left(\frac{2\pi}{3} - \varphi\right) \qquad \text{Eq. 6}$$

wherein $\varepsilon_{long}$ is the longitudinal elongation of the structure and the second term corresponds to the distance a for the different sensors. From this system of equations, where $\varepsilon_1$, $\varepsilon_2$ and $\varepsilon_3$ are the measured data (assuming that the spatial resolution is 1/10 of the helix pitch or smaller), it is possible to compute the longitudinal strain $\varepsilon_{long}$, the orientation φ and the bending radius ρ.

$$\varepsilon_{long} = \frac{\varepsilon_1 + \varepsilon_2 + \varepsilon_3}{2\rho} \qquad \text{Eq. 7}$$

$$\tan\varphi = \frac{1}{\sqrt{3}}\left(\frac{\varepsilon_2 - \varepsilon_3}{\varepsilon_1 - \varepsilon_{long}}\right) \qquad \text{Eq. 8}$$

$$\frac{1}{\rho} = \frac{2}{d}\sqrt{(\varepsilon_1 - \varepsilon_{long})^2 + \frac{1}{3}(\varepsilon_2 - \varepsilon_3)^2} \qquad \text{Eq. 9}$$

According to the invention there is provided a method of determining deformation in a structure around which at least one sensing optical fiber is helically wound. The structure may be for example a pipe, riser, umbilical, power cable or any other suitable structure. In the present application deformation in the structure includes strain within the structure and/or bending of the structure. Strain includes elongation and compression of the structure. When the structure is locally elongated this is indicated by a positive strain value.

When the structure is locally compressed this is indicated by a negative strain value. The sensing optical fiber is arranged to cooperate with the structure so that the sensing optical fiber bends, elongates and/or compresses when the structure bends, elongates and/or compresses; preferably the said more than two sensing optical fibers are arranged to be secured to a surface of the structure. Thus any amount of elongation, compression or bending in the sensing optical fiber will correspond to the same amount of elongation, compression or bending in the structure. Note that twisting of the structure is a combination of elongation/compression and is therefore a strain of the structure with the corresponding elongation/compression of the fibre.

The method comprises the step of: performing a distributed measurement at a point along the at least one sensing optical fiber, to obtain a frequency gain spectrum at that point, wherein the step of performing a distributed measurement comprises, adjusting a pulse width of a pulse pump signal so as to achieve a predefined spatial resolution for the detection of deformation, and providing the pulse pump signal with adjusted pulse width in the sensing optical fiber to generate scattering which is used to obtain said frequency gain spectrum, wherein said predefined spatial resolution for the detection of deformation is a value which is within the range 'pitch of the helical wound sensing optical fiber −50% of the pitch of the helical wound sensing optical fiber'-'pitch of the helical wound sensing optical fiber +50% of the pitch of the helical wound sensing optical fiber'. The predefined spatial resolution for the detection of deformation will preferably be a value which is within the range 'pitch of the helical wound sensing optical fiber'-'pitch of the helical wound sensing optical fiber +50%'. In a more preferred embodiment of the present invention the predefined spatial resolution for the detection of deformation will be a value which is within the range: 'pitch of the helical wound sensing optical fiber −10% of the pitch of the helical wound sensing optical fiber'-'pitch of the helical wound sensing optical fiber +10% of the pitch of the helical wound sensing optical fiber'.

Figure 8:
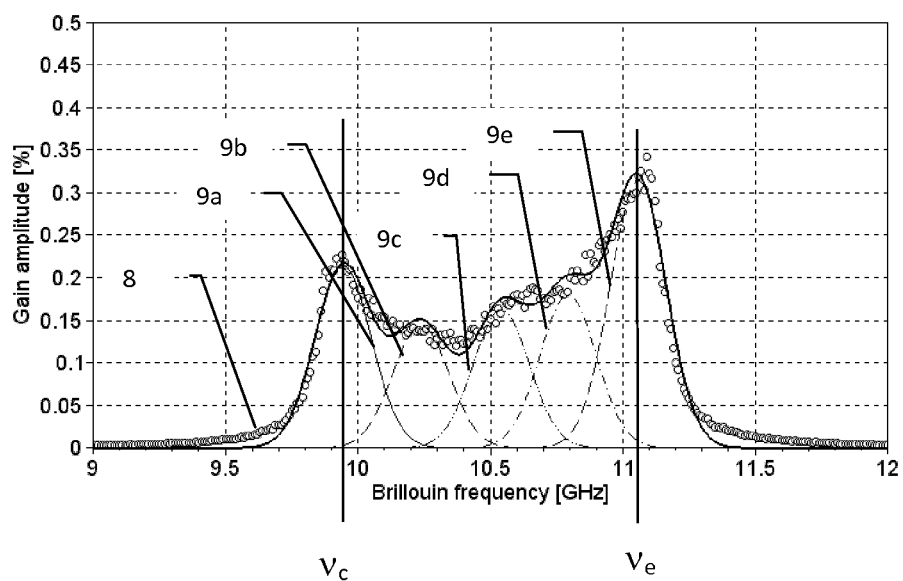
FIG. 8 illustrates an exemplary frequency gain spectrum in the form of a Brillouin frequency gain spectrum, which is used to determining deformation in a structure according to an embodiment of the present invention.

FIG. 8 illustrates an exemplary frequency gain spectrum in the form of a Brillouin frequency gain spectrum 8 which is obtained when a Brillouin backscattering distributed measurement is carried out along a sensing optical fiber which is helically wound around an underwater pipe structure. It will be understood that the present invention is not limited to Brillouin backscattering distributed measurement techniques and that any suitable distributed measurement may be used such as a fiber bragg grating technique or weak fibre bragg grating.

Once the Brillouin frequency gain spectrum 8 has been obtained, at least two curves which, when added together, best fit the frequency gain spectrum are identified. In the example illustrated in FIG. 8 five curves 9a-e which, when added together, best fit the frequency gain spectrum have been identified. The at least two curves which, when added together, best fit the Brillouin gain spectrum, may be identified using any suitable means, and preferably using a least mean squares method; preferably a fitting function is used. The fitting function may be defined for example as the addition of the at least two curves where the parameters defining the at least two curves are fit variables. When the at least two curves are Lorentzian, each is preferably mathematically defined by a center frequency parameter, an amplitude parameter and a width parameter, for example, thereby providing a total of six parameters to the fitting function. The least mean square or any suitable fitting algorithm aims at minimising the difference between the fitting function and the frequency gain spectrum by varying the six parameters. When the difference is minimum, or below at given small value, then a line of best fit is obtained.

So FIG. 8 illustrates five curves 9a-e which best fit the Brillouin gain spectrum 8 when they are added together. In other words the five curves 9a-e, when added together, form a line of best fit for the Brillouin gain spectrum 8. In this example the five curves 9a-e are each Lorentzian curves, however it will be understood that the curves may take any other suitable profile depending on the shape of the Brillouin gain spectrum 8 e.g the five curves may each be Gaussian curves.

Next the frequency at which peaks of the at least two of the best-fit curves 9a-e occur is identified. In the example illustrated in FIG. 8 the lowest frequency ($v_c$) at which a peak of a best-fit curve occurs is identified and the highest frequency ($v_e$) at which the peak of a best-fit curve occurs.

Deformation in the structure is then determined by determining deformation in the at least one sensing optical fiber at said point at which the distributed measurement was performed, using a frequency at which a peak of an identified best-fit curve 9a-e occurs, wherein the amount of deformation in the sensing optical fiber corresponds to the amount of deformation in the structure.

The step of determining deformation in the structure may comprises, determining the amount of strain in the structure. The amount of strain in the structure at the point adjacent to point on the sensing optical fiber where the distributed measurement was performed may be determined by determining the amount of strain in the sensing optical fiber at said point at which the distributed measurement was performed, using a frequency at which a peak of an identified best-fit curve occurs, and a calibration constant ($C_{strain}$) which is representative of the relationship between the frequency of the sensing optical fiber and length of the sensing optical fiber. The amount of strain in the sensing optical fiber corresponds to the amount of strain in the structure; so by determining the strain in the sensing optical fiber at the point where the distributed measurement was perform, one will determine the amount of strain in the structure at the point adjacent to the point on the sensing optical fiber where the distributed measurement was perform.

The amount of stain in the sensing optical fiber may be determined a number of different ways:

For example the amount of strain in the sensing optical fiber, at said point at which the distributed measurement was performed, may be determined using the equation:

$$\varepsilon = (v_e - v_c)/(2 \cdot C_{strain})$$

In another embodiment the amount of strain in the sensing optical fiber, at said point at which the distributed measurement was performed, may be determined by, calculating a central frequency $v_0$ of the frequency gain spectrum using the equation:

$$v_0 = 0.5 * (v_e - \sigma_c)$$

wherein $v_c$ is the lowest frequency gain at which the peak of one of the at least two curves occurs and $v_e$ is the highest frequency gain at which the peak of one of the at least two curves occurs; and then, determining the amount of strain ($\varepsilon$) in sensing optical fiber using the equation:

$$\varepsilon = (v_0 - v_{ref})/C_{strain}$$

wherein $C_{strain}$ is a calibration constant which is representative of the relationship between frequency gain spectrum of the sensing optical fiber and stain in the sensing optical fiber, and wherein $v_{ref}$ is the frequency gain at which the peak of a frequency gain spectrum of the sensing optical fiber, obtained when the sensing optical fiber is unstrained, occurs.

In another embodiment the strain in the sensing optical fiber may be determined by:

calculating a central frequency $v_0$ of the frequency gain spectrum using the equation:

$$v_0=0.5*(v_e-v_c),$$

wherein $v_c$ is the lowest frequency gain at which the peak of one of the at least two curves occurs and $v_e$ is the highest frequency gain at which the peak of one of the at least two curves occurs;

determining a first frequency shift value using the equation:

$$v_0-v_c$$

and/or determining a second frequency shift value using the equation:

$$v_e-v_0$$

determining the amount of strain in the sensing optical fiber, at said point at which the distributed measurement was performed, using the equation:

$$\varepsilon=(v_0-v_c)/(C_{strain}) \text{ or } \varepsilon=(v_e-v_0)/(C_{strain}).$$

The method of the present invention preferably comprises performing the afore-mentioned steps at each of a plurality of points distributed along the whole length of the sensing optical fiber so that deformation at each of a plurality of points along the whole length of the structure can be determined.

The method may comprise the step of, comparing the determined amount of strain in structure with a threshold value and triggering an alarm if the determine amount of strain exceeds the threshold value.

In a further embodiment of the present invention, the method further comprises the step of calculating a bending radius of the structure using the strain in the sensing optical fiber which has been determined in any of the above-mentioned embodiments.

The step of calculating a bending radius of the structure using the amount of strain in the sensing optical fiber may comprise, calculating the bending radius of the structure using at least one of the equations:

$$(a \cdot C_{strain}/v_0-v_c) \text{ or,}$$

$$(a \cdot C_{strain}/v_e-v_0) \text{ or,}$$

wherein 'a' is the distance between the sensing fibre and the structure neutral axis wherein the structure neutral axis is an axis in the cross section of a structure along which there are no longitudinal stresses or strains.

The method may further comprise the step of, comparing the determined bending radius of the structure with a threshold bending radius value and triggering an alarm if the determined bending radius of the structure exceeds the threshold bending radius value.

Each of the above-mentioned embodiments, and each of the embodiment disclosed hereafter, may include calibration of the sensing optical fiber, in which the calibration constant ($C_{strain}$) which is representative of the relationship between frequency of the sensing optical fiber and length of the sensing optical fiber is determined by, elongating the sensing optical fiber to a plurality of lengths;

obtaining the frequency gain spectrum of the sensing optical fiber at each of the plurality of lengths;

obtaining the frequencies at which the peaks of each of the plurality of frequency gain spectrum occurs;

plotting a graph of the obtained frequencies at which the peaks occur verses length of the sensing optical fiber;

obtaining the slope of the graph, wherein the slope of the graph defines the calibration constant.

Figure 9:
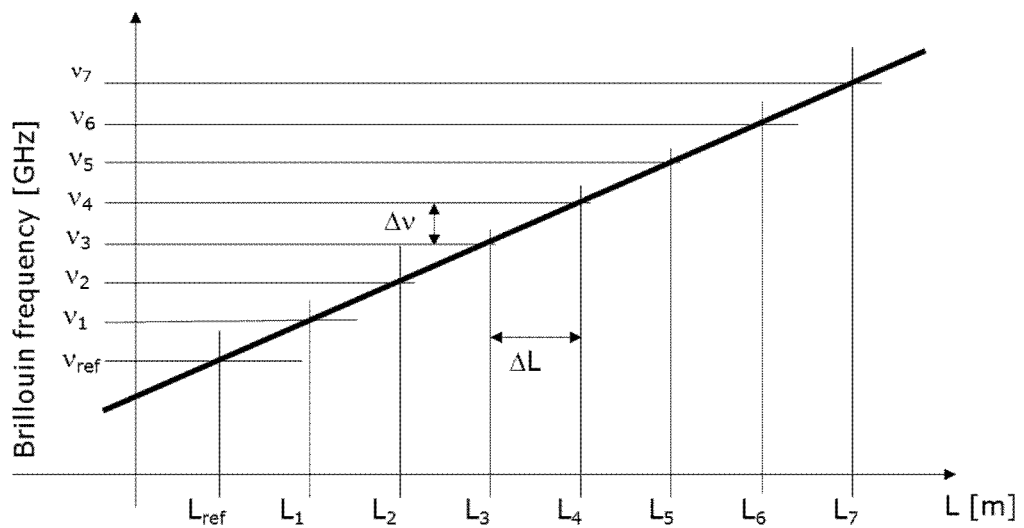
FIG. 9 is a graph of the frequencies at which the peak of a Brillouin gain spectrum of a sensing optical fiber occur verses length of the sensing optical fiber.

In one exemplary embodiment the sensing optical fiber is elongated to a plurality of lengths and a Brillouin frequency gain spectrum of the sensing optical fiber is obtained at each of the plurality of lengths so as to provide a plurality of Brillouin frequency gain spectrum. The frequency at which the peaks of each of the plurality of Brillouin frequency gain spectrums occur is then obtained. A graph of the obtained frequencies at which the peaks occur verses length of the sensing optical fiber is then plotted; FIG. 9 illustrates an example of such a graph. As can be seen in FIG. 9 typically there is a linear relationship between the frequencies at which the peaks of each of the plurality of frequency gain spectrum occurs in the sensing optical fiber and the corresponding plurality of lengths. The slope of the graph is equal to the calibration constant ($C_{strain}$); thus the calibration constant ($C_{strain}$) is then calculated by determining the slope of the graph. As shown in the above-mentioned embodiments, the calibration constant ($C_{strain}$) can be used to calculate strain and/or bending radius of the sensing optical fiber, which corresponds to the strain and/or bending radius in the structure.

In a further embodiment of the present invention, the method may further comprise the step of calculating compression and/or elongation in the structure using the strain in the sensing optical fiber which has been determined in any of the above-mentioned embodiments. The amount of elongation or compression in the sensing optical fiber is equal to the amount of elongation or compression in the structure, so one can determine the amount of elongation or compression in the structure by determining the amount of elongation or compression in the sensing optical fiber The amount ($\Delta L$) of elongation or compression in the sensing optical fiber is calculated using the equation:

$$\varepsilon=\Delta L/L_{ref}$$

wherein $\varepsilon$ is said amount of strain in the sensing optical fiber which has been calculated using any of the above-mentioned embodiments, and $L_{ref}$ is the length of the sensing optical fiber when the sensing optical fiber is unstrained, and wherein the amount ($\Delta L$) of elongation or compression in the sensing optical fiber corresponds to the amount of elongation or compression in the structure. A negative value for the $\Delta L$ variable is indicative of the value being a value of compression, and a positive value for the $\Delta L$ variable is indicative of the value being a value of elongation. The amount of compression or elongation in the sensing optical fiber will correspond to the amount of compression or elongation in the structure.

A change in the length of the structure will also correspond to a change in the frequency at which the peak(s) of the frequency gain spectrum occur, and this change is referred to as a frequency shift. In another embodiment the frequency shift is determined and the amount of strain (i.e. compression or elongation) in the structure is estimated using the frequency shift. The frequency shift is computed as the difference between the frequency $v_0$ at which the peak(s) of the frequency gain spectrum occur and a reference frequency $v_{ref}$, wherein the reference frequency $v_{ref}$ is the frequency at which the peak of a frequency gain spectrum of the sensing optical fiber, obtained when the sensing optical fiber is unstrained, occurs. The amount of strain (ε) in the sensing optical fiber is given by $\varepsilon=(v_0-v_{ref})/C_{strain}$ wherein $C_{strain}$ is a calibration constant which is representative of the relationship between frequency of the sensing optical fiber and length of the sensing optical fiber.

In a further embodiment of the present invention, at least two sensing optical fibers are helically wound around the structure; preferably three sensing optical fibers are helically wound around the structure. Each of the at least two sensing optical fibers will occupy a different position on the structure. For example if the structure is a pipe, riser or umbilical then the at least two sensing optical fibers will be arranged on the surface of the pipe, riser or umbilical at different locations around the circumference of the pipe, riser or umbilical.

In this embodiment the method comprises performing some or all of the steps of the previously mentioned embodiments in each of the at least two sensing optical fibers. However, the step of performing a distributed measurement comprises, adjusting a pulse width of a pulse pump signal so as to achieve a predefined spatial resolution for the detection of deformation, and providing the pulse pump signal with adjusted pulse width in the sensing optical fiber to generate scattering which is used to obtain said frequency gain spectrum, wherein said predefined spatial resolution for the detection of deformation may be a value which is within the range 'pitch of the helical wound sensing optical fiber'-' (pitch of the helical wound sensing optical fiber)–(50% of the pitch of the helical wound sensing optical fiber)'.

For each of the at least two sensing optical fibers a Brillouin frequency gain spectrum will be obtained and at least two best fit curves will be identified. However the step of identifying the frequency at which peaks of the at least two curves occur further comprises, from all of the best fit curves obtained identifying the lowest frequency ($v_c$) at which the peak of a best fit curve occurs and identifying the highest frequency ($v_e$) at which the peak of a best fit curve occurs.

Figure 10:
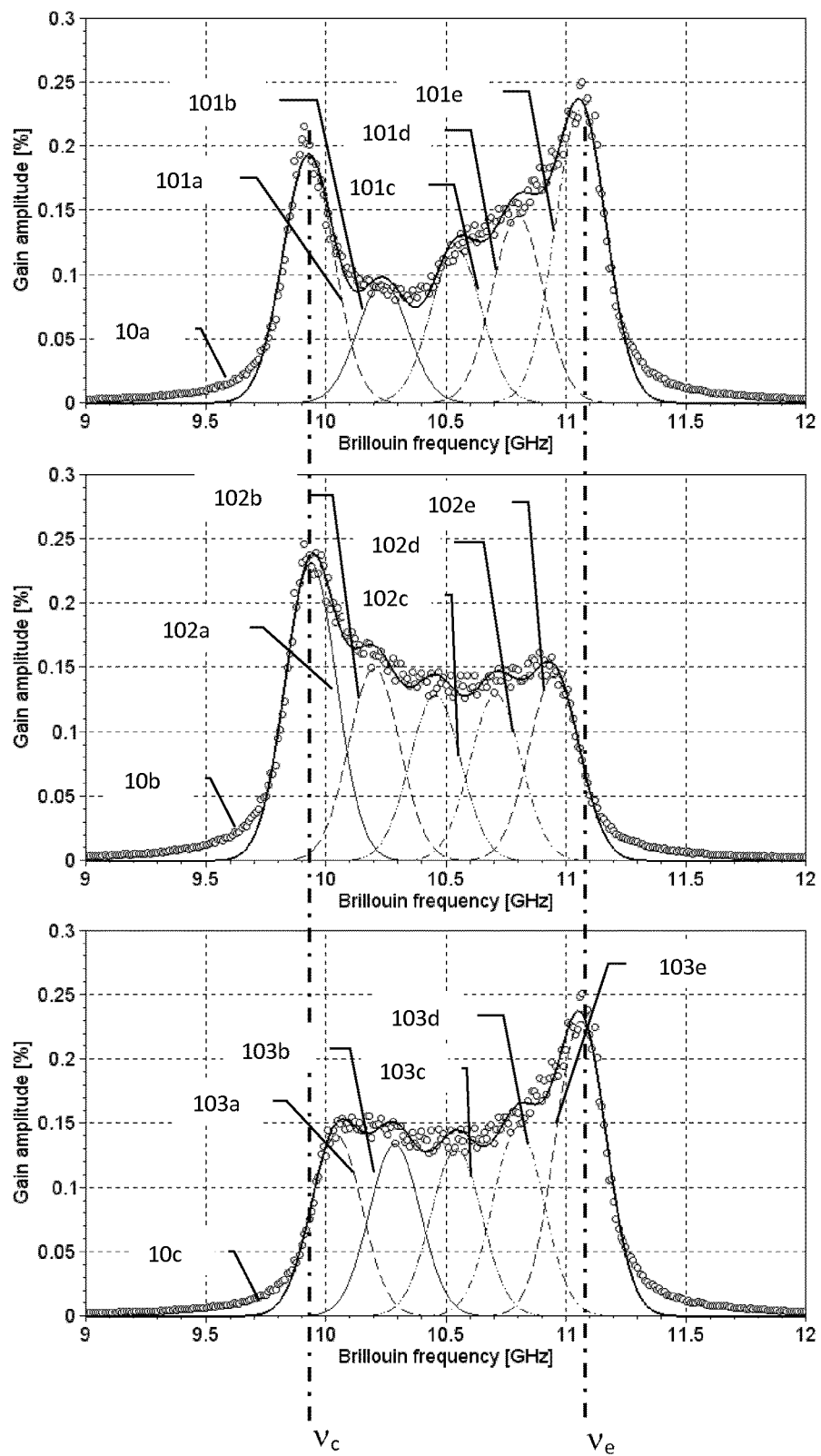
FIG. 10 illustrates three Brillouin frequency gain spectrums used to determine deformation according to an embodiment of the present invention.

For example FIG. 10 illustrates three Brillouin frequency gain spectrums 10a-c which have been obtained from three sensing optical fibers which are helically wound around a structure to be monitored. For each of the three Brillouin frequency gain spectrums, five curves of best-fit 101a-e, 102a-e, 103a-e have been identified using a least mean square method. From all of the curves of best fit 101a-e, 102a-e, 103a-e the lowest frequency ($v_c$) at which the peak of a curve occurs is identified and the highest frequency ($v_e$) at which the peak of a curve occurs is identified.

In this embodiment the step of determining deformation in the structure comprises determining strain in the structure by determining the amount of strain in the sensing optical fiber at said point at which the distributed measurement was performed, using said identified lowest frequency ($v_c$) and/or said identified highest frequency ($v_e$), and a calibration constant ($C_{strain}$) which is representative of the relationship between a frequency gain spectrum of the sensing optical fiber and strain in the sensing optical fiber, wherein the amount of strain in the sensing optical fiber corresponds to the amount of strain in the structure For example the stain and/or bending radius may be determined using the equations mentioned in the previous embodiments, and using said identified lowest frequency ($v_c$) and/or said identified highest frequency ($v_e$), and a calibration constant ($C_{strain}$) for the $v_c$, $v_e$, and $C_{strain}$ variables of those equations respectively. It is assumed here that the three optical fibres have the same calibration constant ($C_{strain}$). But, should each fibre have a different calibration constant C1, C2 and C3, it is still possible to compute the strain and or bending radius using the equations mentioned in the previous embodiments by taking care to use, in the calculation, the calibration constant corresponding to the fibre from which the identified lowest frequency ($v_c$) and/or said identified highest frequency ($v_e$) are used.

In this embodiment preferably the structure is provided with more than two sensing optical fibers helically wound around the structure and arranged to cooperate with the structure. Preferably the at least two sensing optical fibers are arranged to be secured to a surface of the structure. Preferably said at least two sensing optical fibers are arranged so that they are positioned symmetrically around the structure. For example the structure may be a pipe. The pipe may have three sensing optical fibers helically wound around the outer surface of the pipe; the three sensing optical fiber may be arranged so that they are symmetrically positioned around the circumference of the pipe; for example the three sensing optical fibers may be positioned on the surface of the pipe such that there is 120° angle between each successive sensing optical fiber. Likewise, if the pipe is provided with four sensing optical fibers, the four optical fibers may be positioned on the outer surface of the pipe so there is an angle of 90° between each successive sensing optical fiber. It will be understood that the said more than two sensing optical fibers may be are arranged so that they are positioned asymmetrically around the structure. For example, there may be 3 optical fibers provided which cooperate with the structure, and may be arranged such that there is 120° between two of the optical fibers and 20° between one of said two optical fibers and the third optical fiber.

In a further embodiment two or more sensing optical fibers may be helically wound around the structure, and arranged such that there is a predefined angle between each of the two or more sensing optical fibers and a reference axis. Preferably one of the two or more sensing optical fibers will be selected to define the reference axis. The predefined angle between each of the two or more sensing optical fibers and a reference axis on the structure may be an angle from the reference axis to the sensing optical fiber, measured in a clockwise direction from the reference axis, or, may be an angle from the reference axis to the sensing optical fiber, measured in an anti-clockwise direction from the reference axis. The method may comprise measuring the angle between each of the two or more sensing optical fibers and the reference axis. The method may comprise measuring the angle between the two or more sensing optical fibers.

The method will include performing any one or more of the steps mentioned in the previously described embodiments in each of the two or more sensing optical fibers.

The method will further comprise the steps of: for each frequency gain spectrum obtained for each of the two or more sensing optical fibers, computing the ratio of, the amplitude of the peak of a best fit curve occurring at the lowest frequency, to the amplitude of the peak of a best fit curve occurring at the highest frequency, so as to obtain a ratio value for each of the two or more frequency gain spectrums. Then the two or more ratio values are then plotted on a graph against the angle between the reference axis and corresponding sensing optical fiber. Thereafter, a sine graph is identified which can best fit to the plotted ratio values and the phase of the sine graph is determined. The angular position of the measurement point with respect to the reference axis is also determined. The measured point is a point which is a point on the sensing optical fiber which is a distance equal to half the spatial resolution from the point where said distributed measurement was carried out. In all embodiments of this invention preferably the measurement point will lie on the same axis as the point where the distributed measurement was carried out. Then, the bending direction is given by a counter clockwise bending around an axis which is orientated at an angle defined by "phase of the sine" from the reference axis.

Figure 11A:
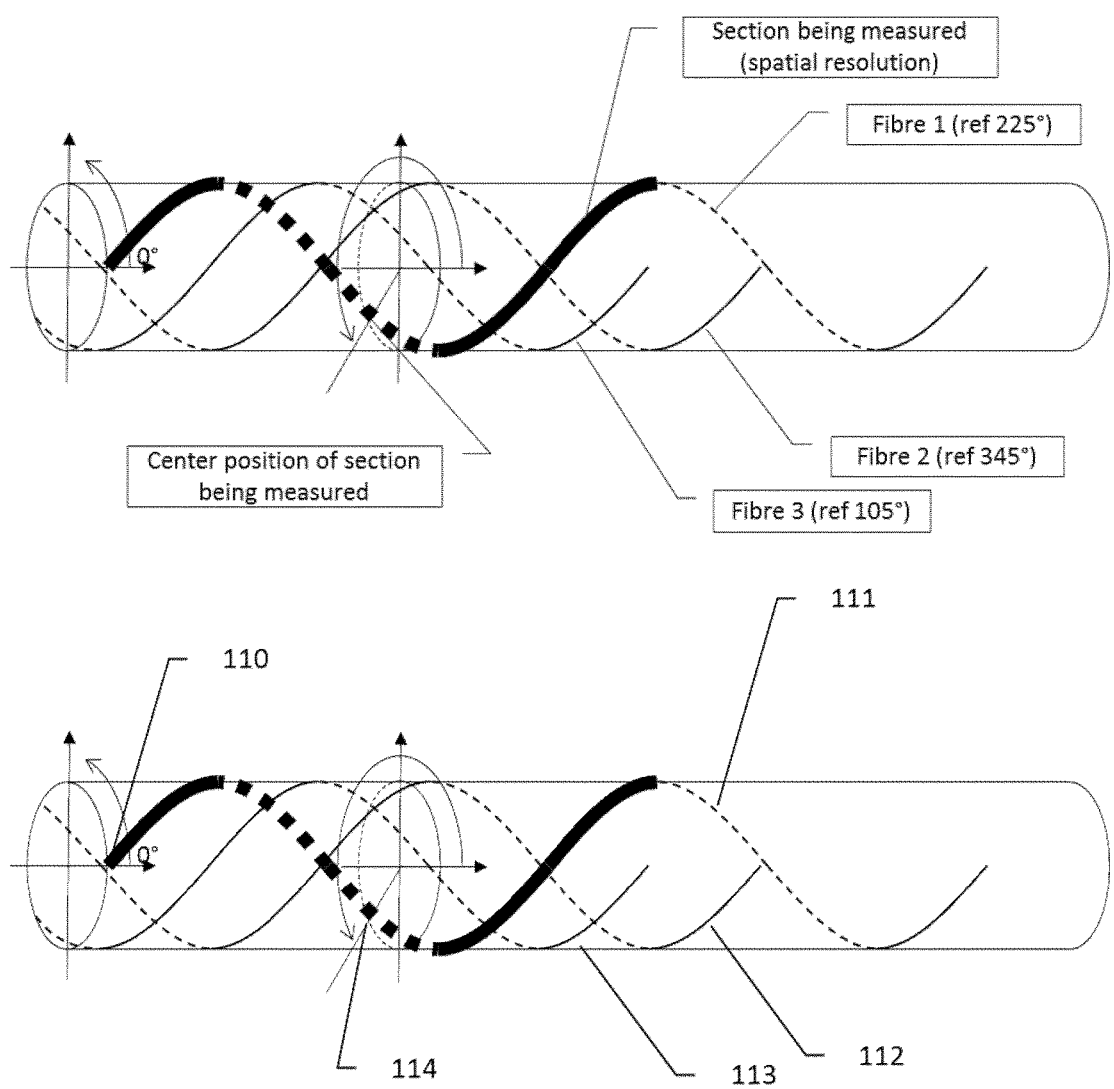
FIG. 11 illustrates is a plot of ratio values of highest and lowest frequencies at which peaks of best fit curves occur, versus the angular orientation of the respective sensing optical fiber, used to determine bending direction according to an embodiment of the present invention.

For example, FIG. 11a illustrates three fibres 111, 112 and 113 wound helically with a pitch of 1.2 m around a structure where the reference axis is defined as 0°. In this example the spatial resolution is 150 cm so the measurement point 114 is a point located 75 cm away from the point 110 where the distributed measurement is carried out (in this example point 110 happens to be a point at an extremity of the structure). At the measurement point 111 the fibre 111 is at an angular position 225° with respect to the reference axis, the fibre 112 is at an angular position of 345° with respect to the reference axis, and the fibre 113 position is at an angular position of 105° with respect to the reference axis.

Figure 11B:
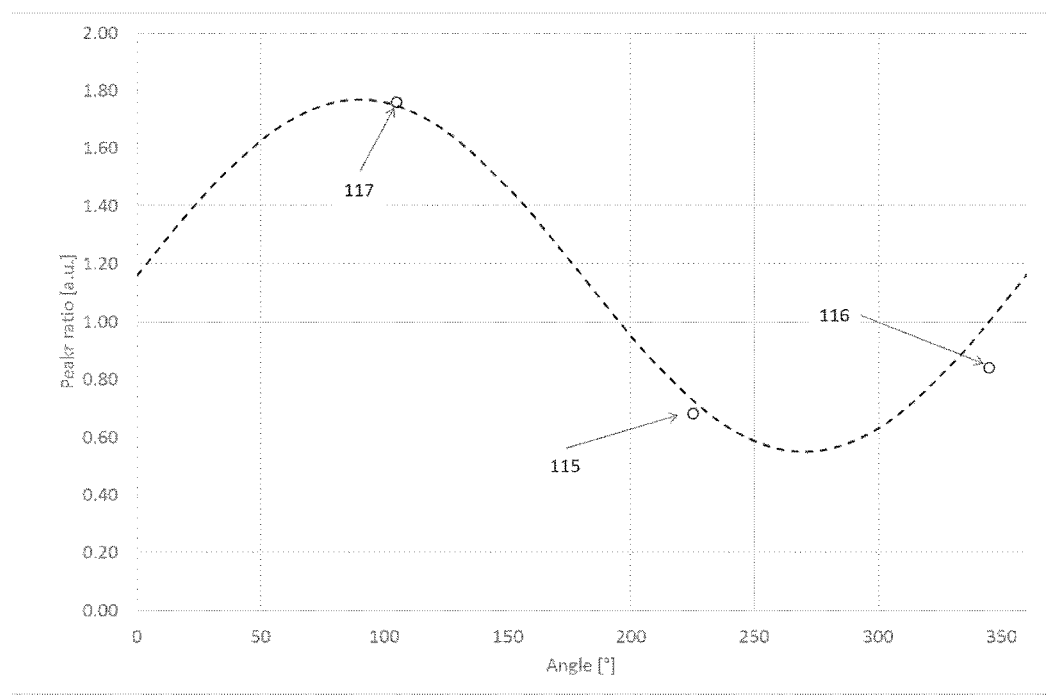

FIG. 11b is a graph of three ratio values plotted against the angle between the reference axis and corresponding sensing optical fiber. The y-axis provides ratio values and the x-axis provides angles of the sensing optical fiber relative to the reference axis. In this example, as the three sensing optical fibers are positioned 120° apart on the structure, then the three ratio values are obtained and the ratio values are plotted 120° apart long the x-axis and are located to the respective position of the measurement point at 225°, 345° and 105° respectively.

Next a sine graph 21, which best fits the three plotted points on the graph, is identified; this can be done using a least mean square method or any other suitable fitting means. Then, the bending direction is given by a counter clockwise bending around an axis which is orientated at an angle defined by "phase of the sine" from the In this particular example, the phase of the sine is found to be 0° reference axis. In other word, for this particular case, the bending direction corresponds to a counter clockwise bending around an axis which is orientated at 0° from the reference axis i.e. is parallel to the reference axis.

In a further embodiment the method may comprise some or all of the steps mention in the previous embodiments, and further comprise the step of computing the difference between the highest frequency ($v_e$) at which the frequency gain spectrum has an amplitude which is equal to half the maximum amplitude of the frequency gain spectrum, and the lowest frequency ($v_c$) at which the frequency gain spectrum has an amplitude which is equal to half the maximum amplitude of the frequency gain spectrum; and estimating the bending radius of the sensing optical fiber using said computed difference between the highest frequency ($v_e$) and the lowest frequency ($v_c$). The bending radius of the sensing optical fiber is equal to the bending radius of the structure around which a sensing optical fiber is helically wound, so one can determine the bending radius of the structure by determining the bending radius of the sensing optical fiber.

The step of estimating the bending radius of the sensing optical fiber may comprise using said computed difference between the highest frequency ($v_e$) and the lowest frequency ($v_c$), and the calibration constant ($C_{strain}$), to estimate the bending radius of the sensing optical fiber to estimate the bending radius using the equation ($2a \cdot C_{strain}/v_e-v_c$) wherein a is the distance between the sensing fibre and the structure neutral axis wherein the structure neutral axis is an axis in the cross section of a structure along which there are no longitudinal stresses or strains.

Figure 12:
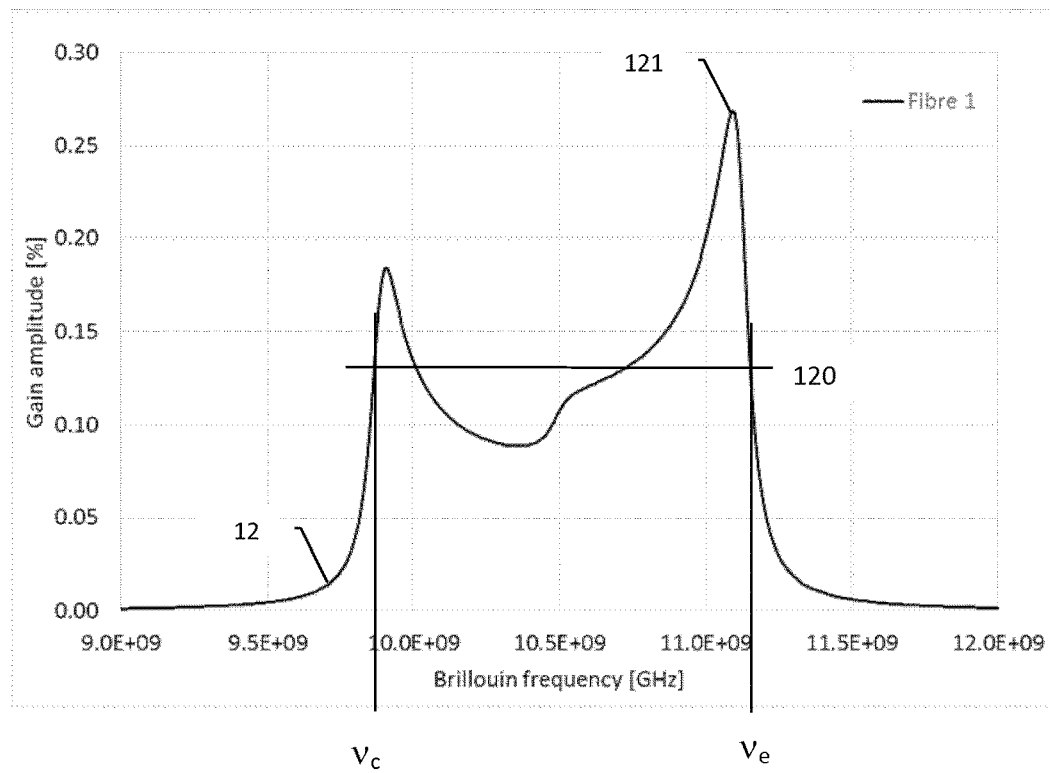
FIG. 12 Illustrates a Brillouin frequency gain spectrum used to determine bending radius according to an embodiment of the present invention.

For example FIG. 12 illustrates a Brillouin frequency gain spectrum 12 obtained by carrying out a Brillouin frequency distributed measurement in a sensing optical fiber which is helically wound around a structure. The maximum amplitude 121 of the Brillouin frequency gain spectrum is identified; then the frequencies at which the amplitude of the Brillouin frequency gain spectrum is half the maximum amplitude 120 are identified; the highest frequency ($v_e$) at which the Brillouin frequency gain spectrum has an amplitude which is equal to half the maximum amplitude of the Brillouin frequency gain spectrum is identified, and the lowest frequency ($v_c$) at which the Brillouin frequency gain spectrum has an amplitude which is equal to half the maximum amplitude of the Brillouin frequency gain spectrum is identified. The difference between the highest frequency ($v_e$) and the lowest frequency ($v_c$) is then calculated to obtain the width of the frequency gain spectrum at half the maximum amplitude of the Brillouin frequency gain spectrum. The bending radius of the sensing optical fiber is then estimated using said computed difference between the highest frequency ($v_e$) and the lowest frequency ($v_c$) and the calibration constant ($C_{strain}$) for the sensing optical fiber; the bending radius of the sensing optical fiber corresponds to the bending radius of the structure around which a sensing optical fiber is helically wound. Specifically, the bending radius of the sensing optical fiber is estimated using the equation:

Bending radius=$(2a \cdot C_{strain} - v_e - v_c)$ wherein a is the distance between the sensing fibre and the structure neutral axis wherein the structure neutral axis is an axis in the cross section of a structure along which there are no longitudinal stresses or strains.

According to a further aspect of the present invention there is provided a method of determining strain in a structure around which at least two sensing optical fibers are helically wound, the at least two sensing optical fibers each occupying a different position on the structure. The structure is preferably provided with more than two sensing optical fibers helically wound around the structure, wherein said more than two sensing optical fibers which are arranged to cooperate with the structure. Preferably the said more than two sensing optical fibers are arranged to be secured to a surface of the structure. Preferably said more than two sensing optical fibers which are arranged so that they are positioned symmetrically around the structure. For example the structure may be a pipe. The pipe may have three sensing optical fibers helically wound around the outer surface of the pipe; the three sensing optical fiber may be arranged so that they are symmetrically positioned around the circumference of the pipe; for example the three sensing optical fibers may be positioned on the surface of the pipe such that there is 120° angle between each successive sensing optical fiber. Likewise, if the pipe is provided with four sensing optical fibers, the four optical fibers may be positioned on the outer surface of the pipe so there is an angle of 90° between each successive sensing optical fiber. It will be understood that alternatively said more than two sensing optical fibers may be are arranged so that they are positioned asymmetrically around the structure. For example, there may be three optical fibers provided which cooperate with the structure, and may be arranged such that there is 120° between two of the optical fibers and 20° between one of said two optical fibers and the third optical fiber.

Said method of determining strain comprises the step of: for each of the at least two sensing optical fibers, performing a distributed measurement at a point along the sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is less than the pitch of the helical wound sensing optical fiber.

For each of the at least two frequency gain spectrums obtained, at least two curves which, when added together, best fit the frequency gain spectrum are identified; this can be achieved using a least mean square method or any other suitable curve fitting method. From all of the best fit curves obtained, the lowest frequency $(v_c)$ at which the peak of a curve occurs is identified and the highest frequency $(v_e)$ at which the peak of a curve occurs is identified.

Figure 13:
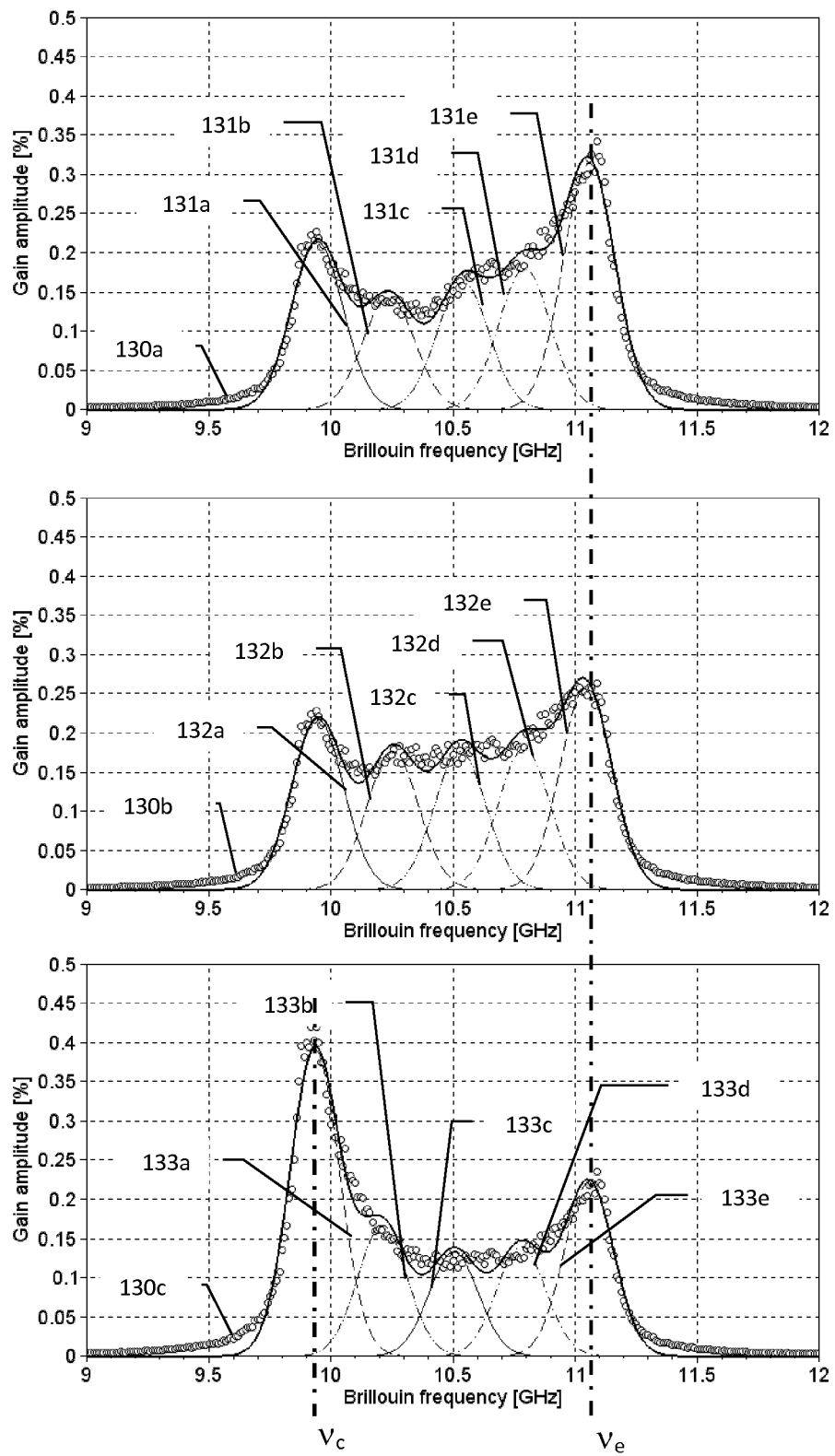
FIG. 13 illustrates three Brillouin frequency gain spectrums used to determine deformation according to an embodiment of the present invention.

For example FIG. 13 illustrates three Brillouin frequency gain spectrums 130a-c which have been obtained from three sensing optical fibers which are helically wound around a structure to be monitored, with a pitch of 1.2 m. In this example a spatial resolution of 1 m is used. For each of the three Brillouin frequency gain spectrums, five curves of best-fit 131a-e, 132a-e, 133a-e have been identified using a least mean square method. From all of the fifteen curves of best fit 131a-e, 132a-e, 133a-e the lowest frequency $(v_c)$ at which the peak of a curve occurs is identified and the highest frequency $(v_e)$ at which the peak of a curve occurs is identified. In this example the curve of best-fit which has the lowest frequency $(v_c)$ is in the Brillouin frequency gain spectrums 113c.

In this embodiment the step of determining deformation in the structure comprises determining strain in the structure by determining the amount of strain in the sensing optical fiber at said point at which the distributed measurement was performed, using said identified lowest frequency $(v_c)$ and/or said identified highest frequency $(v_e)$, and a calibration constant $(C_{strain})$ which is representative of the relationship between a frequency gain spectrum of the sensing optical fiber and strain in the sensing optical fiber, wherein the amount of strain in the sensing optical fiber corresponds to the amount of strain in the structure. For example the stain and/or bending radius may be determined using the equations mentioned in the previous embodiments, and using said identified lowest frequency $(v_c)$ and/or said identified highest frequency $(v_e)$, and a calibration constant $(C_{strain})$ for the $v_c$, $v_e$, and $C_{strain}$ variables of those equations respectively. The calibration constant $(C_{strain})$ for a sensing optical fiber may be determined in the manner described above. It is assumed here that the three optical fibres have the same calibration constant $(C_{strain})$. But, should each fibre have a different calibration constant $(C_{strain1})$, $(C_{strain2})$ and $(C_{strain3})$, it is still possible to compute the strain and or bending radius using the equations mentioned in the previous embodiments by taking care to use the proper calibration constant corresponding to the fibre from which the identified lowest frequency $(v_c)$ and/or said identified highest frequency $(v_e)$ are used.

The amount of stain in the sensing optical fiber may be determined a number of different ways:

For example the amount of strain in the sensing optical fiber, at said point at which the distributed measurement was performed, may be determined using the equation:

$$\varepsilon=(v_e-v_c)/(2 \cdot C_{strain})$$

Wherein $v_c$ is said identified lowest frequency and $v_e$ is said identified highest frequency, and $C_{strain}$ is the calibration constant of the fibre corresponding to the graph from which $(v_c)$ and $(v_e)$ were determined. In another embodiment the amount of strain in the sensing optical fiber, at said point at which the distributed measurement was performed, may be determined by, calculating a central frequency $v_0$ of the frequency gain spectrum using the equation: $v_0=0.5*(v_e-v_c)$, wherein $v_c$ is the lowest frequency at which the peak of one of the at least two curves occurs and $v_e$ is the highest frequency at which the peak of one of the at least two curves occurs; and then, determining the amount of strain ($\varepsilon$) in sensing optical fiber using the equation:

$$\varepsilon=(v_0-v_{ref})/C_{strain}$$

wherein $C_{strain}$ is said calibration constant which is representative of the relationship between a frequency gain spectrum of the sensing optical fiber and strain in the sensing optical fiber, and wherein $v_{ref}$ is the frequency at which the peak of a frequency gain spectrum of the sensing optical fiber, obtained when the sensing optical fiber is unstrained, occurs.

In another embodiment the strain in the sensing optical fiber may be determined by:

calculating a central frequency $v_0$ of the frequency gain spectrum using the equation:

$$v_0=0.5*(v_e-v_c),$$

wherein $v_c$ is said lowest frequency at which the peak of one of the at least two curves occurs and $v_e$ is said highest frequency at which the peak of one of the at least two curves occurs;

determining a first frequency shift value using the equation:

$$v_0-v_c$$

and/or determining a second frequency shift value using the equation:

$$v_e-v_0$$

determining the amount of strain in the sensing optical fiber, at said point at which the distributed measurement was performed, using the equation:

$$\varepsilon=(v_0-v_c)/(C_{strain}) \text{ or } \varepsilon=(v_e-v_0)/(C_{strain}).$$

The method of the present invention preferably comprises performing the afore-mentioned steps at each of a plurality of points distributed along the whole length of the sensing optical fiber so that deformation at each of a plurality of points along the whole length of the structure can be determined.

The method may comprise the step of, comparing the determined amount of strain in structure with a threshold value and triggering an alarm if the determine amount of strain exceeds the threshold value.

The method of determining strain may comprise the steps of calculating a bending radius of the structure. In an embodiment the method of determining strain may further comprise the steps of calculating a bending radius of the structure using at least one of the equations:

$$(a \cdot C_{strain}/v_0-v_c) \text{ or,}$$

$$(a \cdot C_{strain}/v_e-v_0) \text{ or,}$$

$$(2a \cdot C_{strain}/v_e-v_c)$$

wherein 'a' is the distance between the sensing fibre and the structure neutral axis wherein the structure neutral axis is an axis in the cross section of a structure along which there are no longitudinal stresses or strains.

In an embodiment the method of determining strain may comprise the steps of determining the calibration constant ($C_{strain}$) of the sensing optical fiber, by elongating the sensing optical fiber to a plurality of lengths;

obtaining the frequency gain spectrum at each of the plurality of lengths;

obtaining the frequencies at which the peaks of each of the plurality of frequency gain spectrum occurs;

plotting a graph of the obtained frequencies verses length of the sensing optical fiber;

obtaining the slope of the graph, wherein the slope of the graph defines the calibration constant.

In a further embodiment the method of determining strain may comprise the step of, determining the amount (ΔL) of elongation or compression in the sensing optical fiber using the equation:

$$\varepsilon = \Delta L / L_{ref}$$

wherein ε is said determined amount of strain in the sensing optical fiber, and $L_{ref}$ is the length of the sensing optical fiber when the sensing optical fiber is unstrained, wherein the amount (ΔL) of elongation or compression in the sensing optical fiber corresponds to the amount of elongation or compression in the structure.

According to a further aspect of the present invention there is provided a method of determining the bending direction of a structure around which two or more sensing optical fibers are helically wound, the angle between each of the two or more sensing optical fibers and a reference axis being known. Typically the reference axis is a point on the structure or one of the two or more sensing optical fibers defines the reference axis. The method comprises the step of, for each of the two or more sensing optical fibers, performing a distributed measurement at a point along a sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is less than 'pitch of the helical wound sensing optical fiber +50%'.

Then for each of the at least two frequency gain spectrums obtained, at least two curves which, when added together, best fit the frequency gain spectrum are identified. This can be done using a least mean square method as described in the above mentioned embodiments, or using any other suitable fitting technique.

For each of the two or more frequency gain spectrums, the ratio of the amplitude of the peak of a best fit curve occurring at the lowest frequency to the amplitude of the peak of a best fit curve occurring at the highest frequency is computed so as to obtain a ratio value for each of the two or more frequency gain spectrum.

Figure 14:
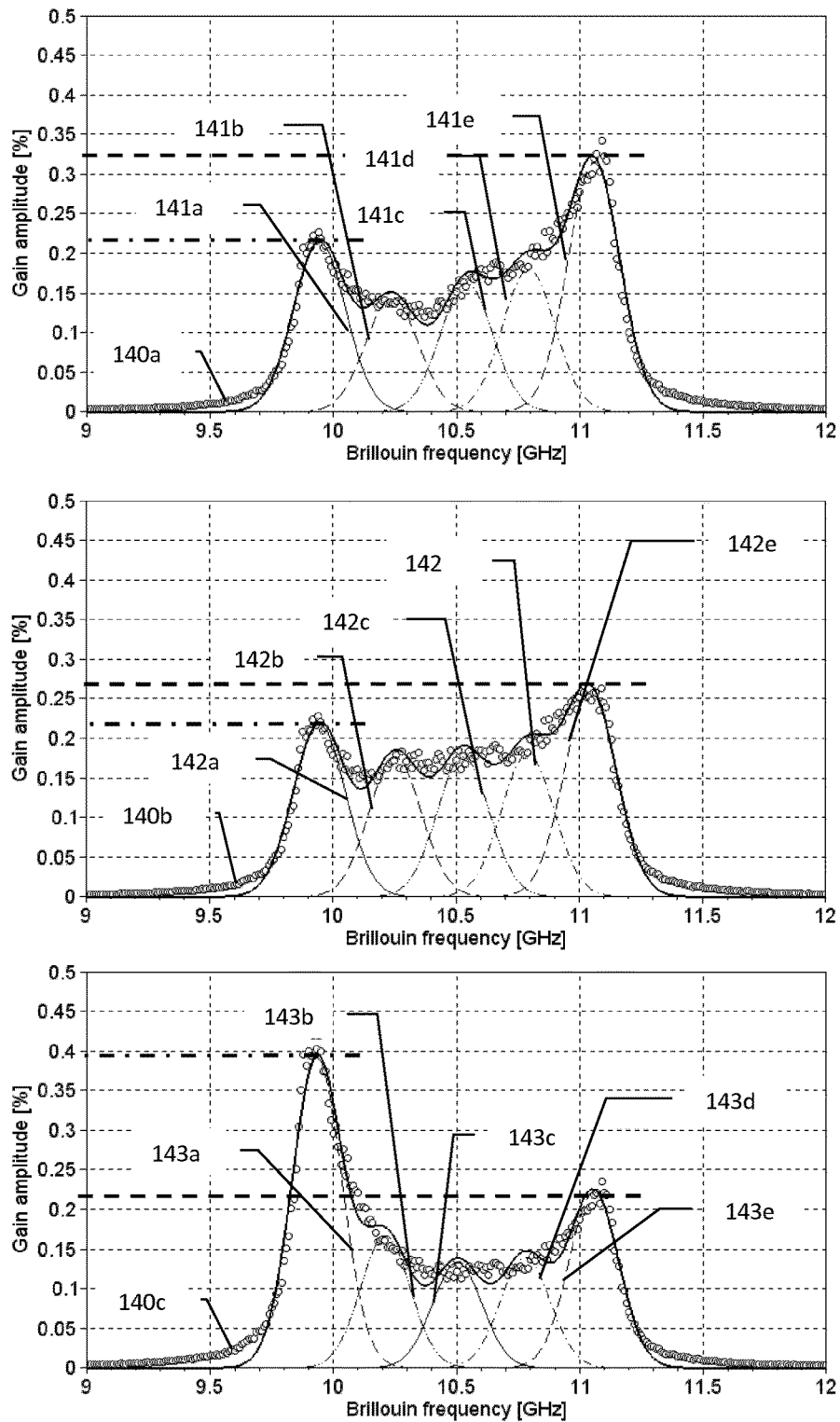
FIG. 14 illustrates three Brillouin frequency gain spectrums used to determine bending radius according to an embodiment of the present invention.

For example FIG. 14 illustrates three Brillouin frequency gain spectrums 140a-c which have been obtained from three sensing optical fibers which are helically wound around a pipe structure to be monitored. In this example the three sensing optical fibers are positioned on the circumference of the pipe structure such that they are 120° apart. A measurement point corresponding to a distance which is half the spatial resolution, from the point where the distributed measurement was carried out, is selected. In this example the spatial resolution is 150 cm. A reference axis is selected to defined 0° and is located in this example at 3 o'clock. At the measurement point the fibre 1 is at an angular position of 225° with respect to the reference axis, the fibre 2 is at an angular position is 345° with respect to the reference axis and the fibre 3 is at an angular position of 105° with respect to the reference axis.

For each of the three Brillouin frequency gain spectrums, five curves of best-fit 141a-c, 142a-c, 143a-c have been identified using a least mean square method. For each of the three frequency gain spectrums, the ratio of the amplitude of the peak of a best fit curve occurring at the lowest frequency to the amplitude of the peak of a best fit curve occurring at the highest frequency is computed. In this example for the Brillouin frequency gain spectrum 140a, the curves 141a and 141d are the curves corresponding to the lowest and highest frequency. The amplitude of the curve 141a is 0.21 and the amplitude of the curve 141d is 0.31. The ratio value is then calculated as 0.2/0.31=0.68. For the Brillouin frequency gain spectrum 140b, the curves 142a and 142d are the curves corresponding to the lowest and highest frequency. The amplitude of the curve 142a is 0.22 and the amplitude of the curve 142d is 0.26. The ratio value is then calculated as 0.22/0.26=0.84. Likewise for the Brillouin frequency gain spectrum 140c, the curves 143a and 143d are the curves corresponding to the lowest and highest frequency. The amplitude of the curve 143a is 0.39 and the amplitude of the curve 143c is 0.22. The ratio value is then calculated as 0.39/0.22=1.76.

Figure 15:
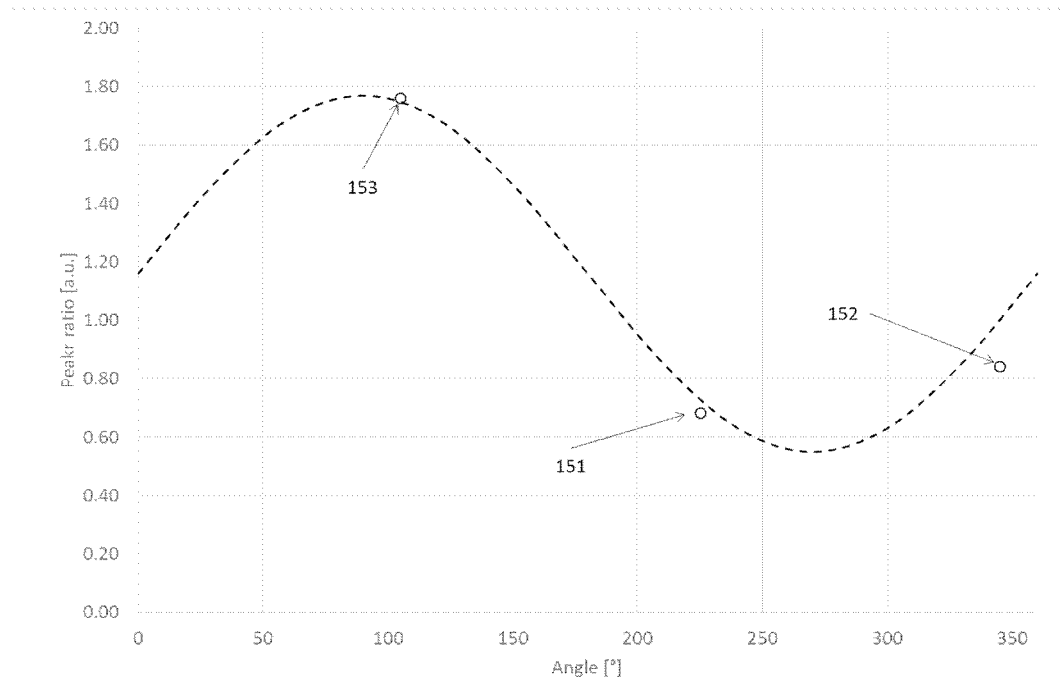
FIG. 15 is a plot of ratio values of highest and lowest frequencies at which peaks of best fit curves occur, versus the angular orientation of the respective sensing optical fiber, used to determine bending direction according to an embodiment of the present invention.

Next all of the ratio values are plotted against the angle between the reference axis and corresponding sensing optical fiber to provide a graph as shown in FIG. 15. For example the Brillouin frequency gain spectrum 140a was obtained from the first sensing optical fiber which is located at 225°, so the ratio value 0.68 is plotted along the x-axis at 225°. Similarly the other ratio values are plotted at 345° and 105° respectively.

Next a sine wave which can best fit to the plotted ratio values is then identified. This can be done using a least mean square method or any other suitable fitting technique which results in a sine amplitude, phase and offset. In this particular example, the sine of the phase is found to be 0°.

Finally the bending direction of the structure is determined using the determined phase. In this example, the phase of the sine is 0° meaning that the axis around which the structure is bent is orientated at an angle of 0° with respect to the reference axis, namely the axis around which the structure is bent is orientated so that it extends along the 3 o'clock position. The structure is thus bent counter-clockwise around an axis that it extends along the 3 o'clock position.

It will be understood that the method may comprise the step of choosing a reference axis, and measuring the position of each the two or more sensing optical fibers relative to the reference axis e.g. measuring the angle between each the two or more sensing optical fibers and the reference axis. The method may comprise measuring the position of the two or more sensing optical fibers relative to each other e.g. measuring the angle between each of the two or more sensing optical fibers.

Figure 16:
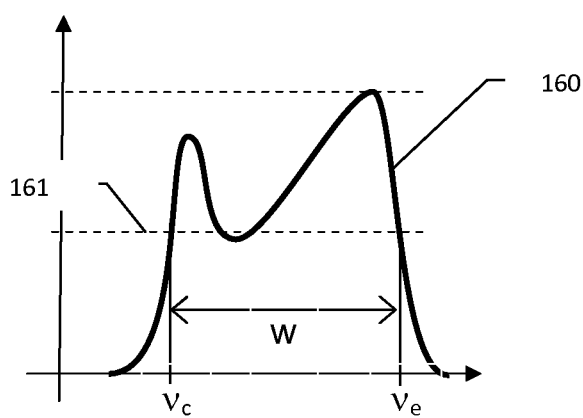
FIG. 16 illustrates a Brillouin frequency gain spectrum used to determine deformation according to an embodiment of the present invention.

According to a further aspect of the present invention there is provided a method for estimating the bending radius of a structure around which a sensing optical fiber is helically wound. The method comprises the step of, performing a distributed measurement at a point along a sensing optical fiber, to obtain a frequency gain spectrum at that point, wherein the step of performing a distributed measurement comprises, adjusting a pulse width of a pulse pump signal so as to achieve a predefined spatial resolution for the detection of strain, and providing the pulse pump signal with adjusted pulse width in the sensing optical fiber to generate scattering which is used to obtain said frequency gain spectrum, wherein said predefined spatial resolution for the detection of strain is a value which is within the range 'pitch of the helical wound sensing optical fiber −50%'-'pitch of the helical wound sensing optical fiber +50%'. For example FIG. 16 illustrates a Brillouin frequency gain spectrum 160 which has been obtained from a sensing optical fiber which is helically wound around a structure, such as a pipe, to be monitored.

Next the width of the Brillouin frequency gain spectrum 160 at half the maximum amplitude 161 of the Brillouin frequency gain spectrum 160 is determined. This can be done by identifying the highest frequency ($v_e$) and the lowest frequency ($v_c$) at which Brillouin frequency gain spectrum 160 has an amplitude which is equal to half the maximum amplitude of the Brillouin frequency gain spectrum 160, and subtracting those identified frequencies (i.e. $v_e - v_c$).

The amount of bending in the sensing optical fiber is then estimated using said determined width, and the calibration constant ($C_{strain}$) which is representative of the relationship between frequency of the sensing optical fiber and length of the sensing optical fiber optical using the equation $(2a \cdot C_{strain}/v_e - v_c)$ wherein a is the distance between the sensing fibre and the structure neutral axis wherein the structure neutral axis is an axis in the cross section of a structure along which there are no longitudinal stresses or strains. The amount of bending in the sensing optical fiber corresponds to the amount of bending in the structure, specifically the amount of bending in the sensing optical fiber is equal to the amount of bending in the structure.

Various modifications and variations to the described aspects and embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

For example, in each of the above mentioned exemplary embodiments the step of performing a distributed measurement was described as involving performing a Brillouin frequency distributed measurement. The steps involved in performing a Brillouin frequency distributed measurement are well known in the art and thus will only be explained briefly. To perform a Brillouin frequency distributed measurement a pulse pump signal in provided a first end of an sensing optical fiber, and a probe signal is provided in the opposite end of said sensing optical fiber, so that both the pulse pump and probe signals interact in the optical fibre to generate stimulated Brillouin backscattering; the stimulated Brillouin backscattering is detected and is used to obtain a frequency gain spectrum in the form of a Brillouin frequency gain spectrum.

It will be understood that the present invention is not limited to the use of a Brillouin frequency distributed measurement and a person skilled in the art will recognise that other frequency distribution methods may alternatively be used. For example the step of performing a distributed measurement may alternatively comprise providing a sensing optical fiber which comprises one or more fibre brag gratings (FBG), providing the pulse pump signal in the sensing optical fiber, scattering the pulse pump signal using the fibre brag gratings, using the scattering of the pulse pump signal to obtain a frequency gain spectrum in the form of a FBG frequency spectrum.

The step of performing a distributed measurement may comprise providing a sensing optical fiber which comprises a single weak fibre brag gratings (WFBG), providing the pulse pump signal in the sensing optical fiber, scattering the pulse pump signal using the continuous weak fibre brag gratings, using the scattering of the pulse pump signal to obtain a frequency gain spectrum in the form of a WFBG frequency spectrum.

What is claimed is:

1. A method of determining deformation in a structure around which at least one sensing optical fiber is helically wound, the method comprising the steps of:
   (a) performing a distributed measurement at a point along the at least one sensing optical fiber, to obtain a frequency gain spectrum at that point, wherein the step of performing a distributed measurement comprises, adjusting a pulse width of a pulse pump signal so as to achieve a predefined spatial resolution for the detection of deformation, and providing the pulse pump signal with adjusted pulse width in the sensing optical fiber to generate scattering which is used to obtain said frequency gain spectrum, wherein said predefined spatial resolution for the detection of deformation is a value which is within the range '(pitch of the helical wound sensing optical fiber)−(50% of the pitch of the helical wound sensing optical fiber)'-'(pitch of the helical wound sensing optical fiber)+(50% of the pitch of the helical wound sensing optical fiber)';
   (b) identifying at least two curves which, when added together, best fit the frequency gain spectrum;
   (c) identifying the frequency at which peaks of the at least two curves occur;
   (d) determining deformation in the structure by determining deformation in the at least one sensing optical fiber, at said point at which the distributed measurement was performed, using a frequency at which a peak of an identified curve occurs, wherein the amount of deformation in the sensing optical fiber corresponds to the amount of deformation in the structure.

2. A method according to claim 1 wherein the step of determining deformation in the structure comprises, determining the amount of strain in the structure by determining the amount of strain in the sensing optical fiber at said point at which the distributed measurement was performed, using a frequency at which a peak of an identified curve occurs, and a calibration constant ($C_{strain}$) which is representative of the relationship between frequency gain spectrum of the sensing optical fiber and strain in the sensing optical fiber, wherein the amount of strain in the sensing optical fiber corresponds to the amount of strain in the structure.

3. A method according to claim 2 comprising,
   calculating a central frequency $v_0$ of the frequency gain spectrum using the equation: $v_0 = 0.5*(v_e - v_c)$, wherein $v_c$ is the lowest frequency at which the peak of one of the at least two curves occurs and $v_e$ is the highest frequency at which the peak of one of the at least two curves occurs;
   determining a first frequency shift value using the equation: $v_0 - v_c$ and/or determining a second frequency shift value using the equation: $v_e - v_0$;
   wherein the step of determining deformation in the structure comprises determining the amount of strain in the structure by determining the amount of strain in the sensing optical fiber, at said point at which the distributed measurement was performed, using the first frequency shift value and said calibration constant ($C_{strain}$), wherein the amount of strain in the sensing optical fiber corresponds to the amount of strain in the structure, and/or determining the amount of strain in the structure, at said point at which the distributed measurement was performed, using the second frequency shift value and said calibration constant, wherein the amount of strain in the sensing optical fiber corresponds to the amount of strain in the structure.

4. A method according to claim 2 comprising,
identifying the lowest frequency ($v_c$) at which a peak of one of the at least two curves occurs and identifying the highest frequency ($v_e$) at which the peak of one of the at least two curves occurs;
determining the amount of strain in the sensing optical fiber, at said point at which the distributed measurement was performed, using the identified lowest ($v_c$) and highest ($v_e$) frequencies and said calibration constant ($C_{strain}$), wherein the amount of strain in the sensing optical fiber corresponds to the amount of strain in the structure.

5. A method according to claim 2 comprising,
calculating a central frequency $v_0$ of the frequency gain spectrum using the equation: $v_0 = 0.5*(v_e - v_c)$, wherein $v_c$ is the lowest frequency at which the peak of one of the at least two curves occurs and $v_e$ is the highest frequency at which the peak of one of the at least two curves occurs;
determining the amount of strain ($\varepsilon$) in sensing optical fiber using the equation $$\varepsilon = (v_0 - v_{ref})/C_{strain}$$

wherein $C_{strain}$ is a calibration constant which is representative of the relationship between frequency gain spectrum of the sensing optical fiber and strain in the sensing optical fiber, and wherein $v_{ref}$ is the frequency at which the peak of a frequency gain spectrum of the sensing optical fiber, obtained when the sensing optical fiber is unstrained, occurs.

6. A method according to claim 2, wherein the method further comprises the step of determining the calibration constant by elongating the sensing optical fiber to a plurality of lengths;
obtaining the frequency gain spectrum at each of the plurality of lengths;
obtaining the frequencies at which the peaks of each of the plurality of frequency gain spectrum occurs;
plotting a graph of the obtained frequencies verses length of the sensing optical fiber;
obtaining the slope of the graph, wherein the slope of the graph defines the calibration constant.

7. A method according to claim 2, further comprising the step of,
determining the amount ($\Delta L$) of elongation or compression in the sensing optical fiber using the equation:

$$\varepsilon = \Delta L/L_{ref}$$

wherein $\varepsilon$ is said determined amount of strain in the sensing optical fiber, and $L_{ref}$ is the length of the sensing optical fiber when the sensing optical fiber is unstrained, wherein the amount ($\Delta L$) of elongation or compression in the sensing optical fiber corresponds to the amount of elongation or compression in the structure.

8. A method according to claim 1 wherein the step of determining deformation in the structure comprises determining a bending radius of the structure.

9. A method according to claim 8 wherein the step of calculating a bending radius of the structure comprises, calculating the bending radius of the structure using at least one of the equations:

$$(a \cdot C_{strain}/v_0 - v_c) \text{ or,}$$

$$(a \cdot C_{strain}/v_e - v_0) \text{ or,}$$

$$(2a \cdot C_{strain}/v_e - v_c)$$

wherein, $v_c$ is the lowest frequency at which the peak of one of the at least two curves occurs and $v_e$ is the highest frequency at which the peak of one of the at least two curves occurs, and $v_0$ is $v_0 = 0.5*(v_e - v_c)$, 'a' is the distance between the sensing fiber and the structure neutral axis wherein the structure neutral axis is an axis in the cross section of a structure along which there are no longitudinal stresses or strains.

10. A method according to claim 1, wherein the predefined spatial resolution for the detection of strain is a value which is within the range 'pitch of the helical wound sensing optical fiber'-'(pitch of the helical wound sensing optical fiber)+(50% of the pitch of the helical wound sensing optical fiber)'.

11. A method according to claim 1, wherein at least two sensing optical fibers are helically wound around the structure, each of the at least two sensing optical fibers occupying a different position on the structure, and wherein said predefined spatial resolution for the detection of deformation is a value which is within the range 'pitch of the helical wound sensing optical fiber'-'(pitch of the helical wound sensing optical fiber)-(50% of the pitch of the helical wound sensing optical fiber)', the method comprising the steps of:
performing steps (a)-(b) with each of the at least two sensing optical fibers;
wherein the step of identifying the frequency at which peaks of the at least two curves occur comprises, from all of the best fit curves obtained identifying the lowest frequency ($v_c$) at which the peak of a curve occurs and identifying the highest frequency ($v_e$) at which the peak of a curve occurs;
wherein the step of determining deformation in the structure comprises determining strain in the structure by determining the amount of strain in the sensing optical fiber at said point at which the distributed measurement was performed, using said lowest frequency ($v_c$) and/or said highest frequency ($v_e$), and a calibration constant ($C_{strain}$) which is representative of the relationship between frequency gain spectrum of the sensing optical fiber and strain in the sensing optical fiber, wherein the amount of strain in the sensing optical fiber corresponds to the amount of strain in the structure.

12. A method according to claim 11 wherein the structure has more than two sensing optical fibers helically wound around the structure, wherein said more than two sensing optical fibers are positioned symmetrically around the structure.

13. A method according to claim 1, wherein two or more sensing optical fibers are helically wound around the a structure, the angle between each of the two or more sensing optical fibers and a reference axis on the structure being known, further comprising the steps of,
performing steps (a)-(c) with each of the at least two sensing optical fibers to obtain for each of the at least two sensing optical fibers, a frequency gain spectrum and at least two curves which best fit that frequency gain spectrum; and wherein the step of determining deformation in the structure comprises the step of calculating a bending radius of the structure by carrying out the steps of:

for each of the at least two frequency gain spectrums: compute the ratio of the amplitude of the peaks of two best fit curves which have the highest amplitude, so as to obtain a ratio value, and plot the ratio value against the angle between the reference axis and the sensing optical fiber corresponding to the frequency gain spectrum;

identify a sine graph which can best fit to the plotted ratio values;

determine the phase of the identified sine graph;

determine the bending direction of the structure from the determined phase.

14. A method according to claim 1 wherein the predefined spatial resolution for the detection of strain is a value which is within the range: '(pitch of the helical wound sensing)–(10% of the pitch of the helical wound sensing)'-'(pitch of the helical wound sensing)+(10% of the pitch of the helical wound sensing)'.

15. A method according to claim 1 comprising the step of estimating the bending radius of a structure around which a sensing optical fiber is helically wound by, determining the width of the frequency gain spectrum at half the maximum amplitude of the frequency gain spectrum;

estimating the amount of bending in the sensing optical fiber using said determined width of the frequency gain spectrum at half the maximum amplitude of the frequency gain spectrum, wherein the amount of bending in the sensing optical fiber corresponds to the amount of bending in the structure.

* * * * *

UNITED STATES PATENT AND TRADEMARK OFFICE
CERTIFICATE OF CORRECTION

PATENT NO. : 10,067,013 B2
APPLICATION NO. : 15/311942
DATED : September 4, 2018
INVENTOR(S) : Briffod et al.

Page 1 of 1

It is certified that error appears in the above-identified patent and that said Letters Patent is hereby corrected as shown below:

In the Specification

Column 16, Line 57: please amend the equation as follows:
$v_0 = 0.5 * (v_e - v_c)$ Column 17, Line 50: please amend the equation as follows:
$(2a.C_{strain} / v_e - v_c)$ Signed and Sealed this
Twentieth Day of November, 2018

Andrei Iancu
*Director of the United States Patent and Trademark Office*